(12) United States Patent
Tsai et al.

(10) Patent No.: US 8,780,460 B2
(45) Date of Patent: Jul. 15, 2014

(54) IMAGING LENS SYSTEM

(71) Applicant: Largan Precision Co., Ltd., Taichung (TW)

(72) Inventors: Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 59 days.

(21) Appl. No.: 13/745,600

(22) Filed: Jan. 18, 2013

(65) Prior Publication Data

US 2014/0168794 A1    Jun. 19, 2014

(30) Foreign Application Priority Data

Dec. 14, 2012    (TW) ............................. 101147374 A

(51) Int. Cl.
    *G02B 13/18*    (2006.01)
    *G02B 9/60*     (2006.01)
    *G02B 13/00*    (2006.01)

(52) U.S. Cl.
    CPC   *G02B 13/18* (2013.01); *G02B 9/60* (2013.01); *G02B 13/0045* (2013.01)
    USPC .......................................... 359/714; 359/764

(58) Field of Classification Search
    CPC ....... G02B 13/0045; G02B 13/18; G02B 9/60
    USPC ................................................... 359/714, 764
    See application file for complete search history.

(56) References Cited

U.S. PATENT DOCUMENTS

| 8,000,030 B2 | 8/2011 | Tang |
| 8,179,470 B2 | 5/2012 | Chen et al. |
| 8,369,027 B2 * | 2/2013 | Hsu et al. ....................... 359/714 |
| 8,467,137 B2 * | 6/2013 | Yonezawa et al. ............ 359/714 |
| 8,531,786 B2 * | 9/2013 | Tsai et al. ...................... 359/764 |

* cited by examiner

*Primary Examiner* — David N Spector
(74) *Attorney, Agent, or Firm* — Morris, Manning & Martin, LLP; Tim Tingkang Xia, Esq.

(57) ABSTRACT

An imaging lens system includes, in order from an object side to an image side, a first lens element, a second lens element, a third lens element, a fourth lens element and a fifth lens element. The first lens element with positive refractive power has a convex object-side surface. The second lens element has positive refractive power. The third lens element has positive refractive power. The fourth lens element has refractive power. The fifth lens element with refractive power has a concave image-side surface at a paraxial region, and the image-side surface thereof changes from concave at the paraxial region to convex at a peripheral region, wherein both of an object-side surface and the image-side surface are aspheric.

23 Claims, 24 Drawing Sheets

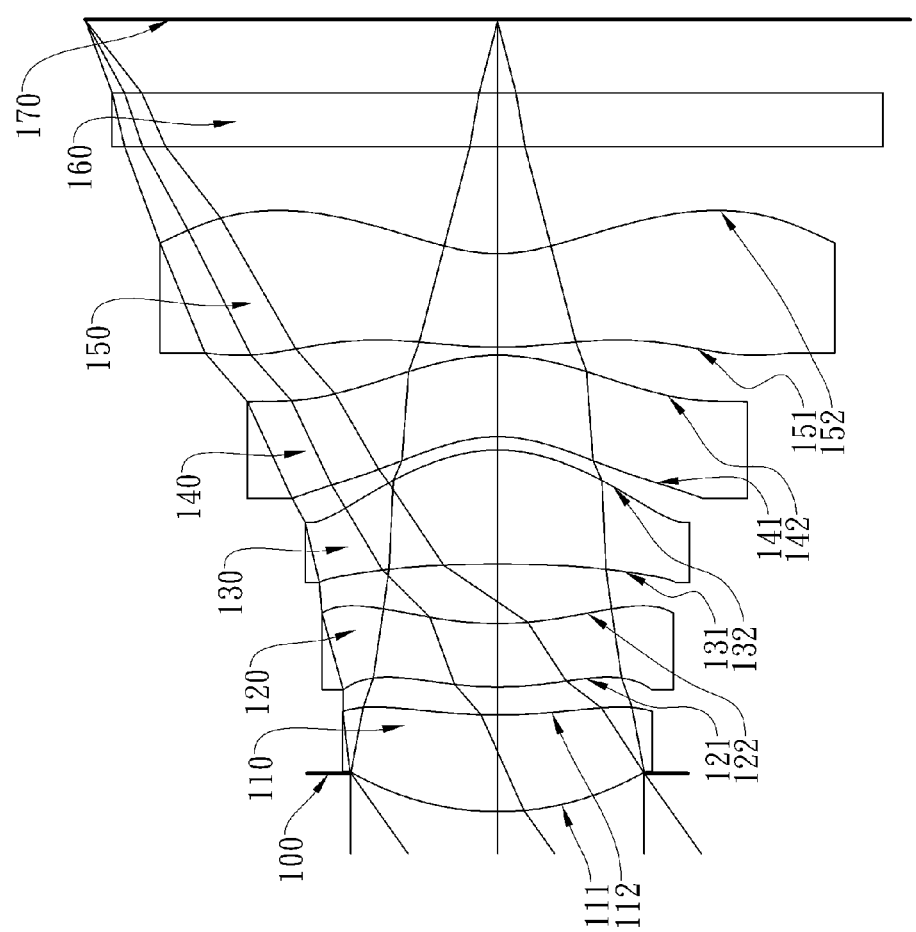

us 8,780,460 B2

IMAGING LENS SYSTEM

RELATED APPLICATIONS

The application claims priority to Taiwan Application Serial Number 101147374, filed Dec. 14, 2012, which is herein incorporated by reference in its entirety.

BACKGROUND

1. Technical Field

The present invention relates to an imaging lens system. More particularly, the present invention relates to a compact imaging lens system applicable to electronic products.

2. Description of Related Art

In recent years, with the popularity of mobile products with camera functionalities, the demand for a miniaturized photographing lens assembly is increasing. The sensor of a conventional photographing camera is typically a CCD (Charge-Coupled Device) image sensor or a CMOS (Complementary Metal-Oxide Semiconductor) sensor. As the advanced semiconductor manufacturing technologies have allowed the pixel size of sensors to be reduced and compact photographing lens assemblies have gradually evolved toward the field of higher megapixels, there is an increasing demand for photographing lens assemblies featuring better image quality.

A conventional and compact optical lens system employed in a portable electronic product such as the one disclosed in the U.S. Pat. No. 8,179,470, mainly adopts a four-element lens structure. Due to the popularity of mobile products with high-end specifications, such as smart phones and PDAs (Personal Digital Assistants), the requirements for smaller pixel size and better image quality have been increasing. However, the conventional four-element lens structure cannot satisfy these requirements of the compact optical lens system.

Although other conventional optical lens systems with five-element lens structure such as the one disclosed in the U.S. Pat. No. 8,000,030 enhance image quality and resolving power, it still reside with unsolved problems. Since there are no three continuous lens elements closest to the object side with positive refractive power, it is not favorable for presenting its telephoto functionality while reducing the total track length of the optical lens system. It is hard to keep this optical lens system compact while achieving for high resolving power.

SUMMARY

According to one aspect of the present disclosure, an imaging lens system includes, in order from an object side to an image side, a first lens element, a second lens element, a third lens element, a fourth lens element and a fifth lens element. The first lens element with positive refractive power has a convex object-side surface. The second lens element has positive refractive power. The third lens element has positive refractive power. The fourth lens element has refractive power. The fifth lens element with refractive power has a concave image-side surface at a paraxial region, wherein the image-side surface of the fifth lens element changes from concave at the paraxial region to convex at a peripheral region, and both of an object-side surface and the image-side surface of the fifth lens element are aspheric. When a focal length of the imaging lens system is f, a curvature radius of an object-side surface of the second lens element is R3, a focal length of the fourth lens element is f4 and a focal length of the fifth lens element is f5, the following relationships are satisfied:

$-0.80 < f/R3 < 4.0;$ $-1.5 < f/f4 < 0.45;$ and $0 < |f5/f4| < 1.50.$

According to another aspect of the present disclosure, an imaging lens system includes, in order from an object side to an image side, a first lens element, a second lens element, a third lens element, a fourth lens element and a fifth lens element. The first lens element with positive refractive power has a convex object-side surface. The second lens element has positive refractive power. The third lens element has positive refractive power. The fourth lens element has refractive power. The fifth lens element with negative refractive power has a concave image-side surface at a paraxial region, wherein the image-side surface of the fifth lens element changes from concave at the paraxial region to convex at a peripheral region, and both of an object-side surface and the image-side surface of the fifth lens element are aspheric. When a focal length of the imaging lens system is f, a curvature radius of an object-side surface of the second lens element is R3, a focal length of the fourth lens element is f4, a focal length of the fifth lens element is f5, a focal length of the third lens element is f3, and a focal length of the second lens element is f2, the following relationships are satisfied:

$-0.80 < f/R3 < 4.0;$ $-2.0 < f/f4 < 1.0;$ $0 < |f5/f4| < 1.50;$ and $0 < f3/f2 < 0.60.$

BRIEF DESCRIPTION OF THE DRAWINGS

The present disclosure can be more fully understood by reading the following detailed description of the embodiment, with reference made to the accompanying drawings as follows:

FIG. 1A is a schematic view of an imaging lens system according to the 1st embodiment of the present disclosure;

DETAILED DESCRIPTION

Figure 1B:
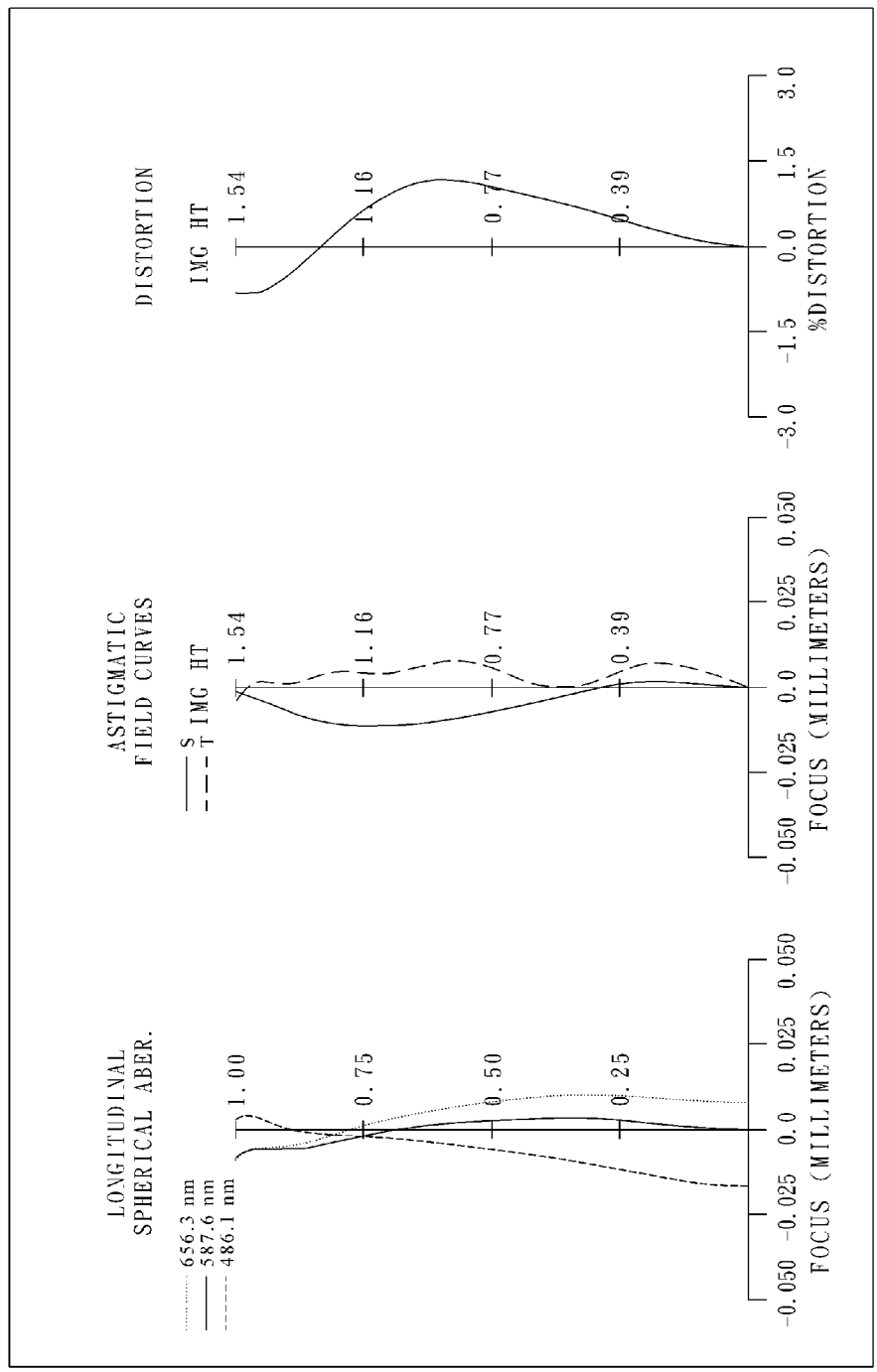
FIG. 1B shows spherical aberration curves, astigmatic field curves and a distortion curve of the imaging lens system according to the 1st embodiment.

An imaging lens system includes, in order from an object side to an image side, a first lens element, a second lens element, a third lens element, a fourth lens element and a fifth lens element.

The first lens element has positive refractive power, so that the total track length of the imaging lens system can be reduced. The first lens element has a convex object-side surface, so that the total track length can be further reduced by adjusting the distribution of the positive refractive power.

The second lens element has positive refractive power, so that the positive refractive power can be balanced so as to reduce the spherical aberration. The second lens element can have a convex object-side surface at a paraxial region and a concave image-side surface at a paraxial region, so that it is favorable for correcting the astigmatism. The object-side surface of the second lens element thereof can change from convex at the paraxial region to concave at a peripheral region. The image-side surface of the second lens element thereof can change from concave at the paraxial region to convex at a peripheral region. Therefore, it is favorable for reducing the angle of incidence onto the image sensor from the off-axis field so as to improve the responding efficiency of an image sensor and to further correct the aberration of the off-axis field.

The third lens element has positive refractive power, so that it is favorable for reducing the system sensitivity. The third lens element can have a convex image-side surface, so that it can be favorable for further reducing the system sensitivity.

The fourth lens element can have a concave object-side surface and a convex image-side surface, so that it is favorable for correcting the astigmatism. Moreover, the image-side surface of the fourth lens element can be inclined toward the image side of the imaging lens system at an end of a peripheral region of the image-side surface of the fourth lens element which within a location of a maximum effective radius thereof. Therefore, it is favorable for further correcting the aberration of the off-axis field.

The fifth lens element can have negative refractive power and a convex object-side surface at a paraxial region, so that it is favorable for correcting the aberration and astigmatism. The fifth lens element has a concave image-side surface at a paraxial region and the image-side surface of the fifth lens element thereof changes from concave at the paraxial region to convex at a peripheral region. Therefore, a principal point of the imaging lens system can be positioned away from the image plane, and the total track length can be further reduced so as to correct the aberration of the off-axis field. Moreover, the fifth lens element can have at least two critical points on the object-side surface, so that it is favorable for reducing the angle of incidence onto the image sensor from the off-axis field so as to improve the responding efficiency of the image sensor.

When a focal length of the imaging lens system is f, and a curvature radius of the object-side surface of the second lens element is R3, the following relationship is satisfied: $-0.80 < f/R3 < 4.0$. Therefore, it is favorable for reducing the astigmatism.

When the focal length of the imaging lens system is f, and a focal length of the fourth lens element is f4, the following relationship is satisfied: $-2.0 < f/f4 < 1.0$. Therefore, it is favorable for correcting the aberration and spherical aberration so as to further improve the image quality. Preferably, the following relationship is further satisfied: $-1.5 < f/f4 < 0.45$. More preferably, the following relationship is satisfied: $-1.0 < f/f4 < 0$.

When a focal length of the fifth lens element is f5, and the focal length of the fourth lens element is f4, the following relationship is satisfied: $0 < |f5/f4| < 1.50$. Therefore, the distribution of the refractive power between the fourth lens element and the fifth lens element will be more balanced, and it is favorable for reducing the system sensitivity. Preferably, the following relationship is satisfied: $0.30 < f5/f4 < 1.0$.

When an axial distance between the image-side surface of the third lens element and the object-side surface of the fifth lens element is Dr6r9, and a central thickness of the third lens element is CT3, the following relationship is satisfied: $0.5 < Dr6r9/CT3 < 1.2$. Therefore, it is favorable for assembling the lens elements and providing favorable moldability and homogeneity for plastic lens elements during the injection molding process and achieving superior image quality. Preferably, the following relationship is satisfied: $0.5 < Dr6r9/CT3 < 1.0$.

When an Abbe number of the second lens element is V2, an Abbe number of the fourth lens element is V4, and an Abbe number of the first lens element is V1, the following relationship is satisfied: $0.6 < (V2+V4)/V1 < 1.0$. Therefore, it is favorable for correcting the chromatic aberration.

When the focal length of the imaging lens system is f, and a focal length of the third lens element is f3, the following relationship is satisfied: $1.20 < f/f3 < 2.50$. Therefore, it is favorable for reducing the sensitivity of the imaging lens system.

When the focal length of the third lens element is f3, and a focal length of the second lens element is f2, the following relationship is satisfied: $0 < f3/f2 < 0.80$. Therefore, it is favorable for balancing the distribution of positive refractive power and further reducing the total track length. Preferably, the following relationship is satisfied: 0<f3/f2<0.60.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and T23 is the largest axial distance among T12, T23, T34, and T45. Therefore, it is favorable for assembling the lens elements by properly adjusting the distance between each lens element so as to increase the manufacturing yield rate.

When the focal length of the imaging lens system is f, a focal length of the first lens element is f1, and the focal length of the second lens element is f2, the following relationship is satisfied: 0.3<|f/f1|+|f/f2|<0.8. Therefore, the telephoto functionality of the imaging lens system can be enhanced so as to reduce the total track length thereof.

According to the imaging lens system of the present disclosure, the lens elements thereof can be made of plastic or glass materials. When the lens elements are made of glass material, the allocation of the refractive power of the imaging lens system may be more flexible and easier to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained for reducing the aberration, and the number of required lens elements for constructing an imaging lens system can be reduced. Therefore, the total track length of the imaging lens system can also be reduced.

According to the imaging lens system of the present disclosure, the imaging lens system can include at least one stop, such as an aperture stop, a glare stop or a field stop. Said glare stop or said field stop is for eliminating the stray light and thereby improving the image resolution thereof.

In the present imaging lens system, an aperture stop can be configured as a front stop or a middle stop. A front stop can provide a longer distance between an exit pupil of the system and an image plane and which improves the image-sensing efficiency of an image sensor. A middle stop is favorable for enlarging the field of view of the system and thereby provides a wider field of view for the same.

According to the imaging lens system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at a paraxial region; and when a lens element has a concave surface, it indicates that the surface is concave at a paraxial region. Critical point is a non-axial point of the lens surface where its tangent is perpendicular to the optical axis.

According to the imaging lens system of the present disclosure, the imaging lens system is featured with good correction ability and high image quality, and can be applied to 3D (three-dimensional) image capturing applications, in products such as digital cameras, mobile devices and tablets.

Figure 12:
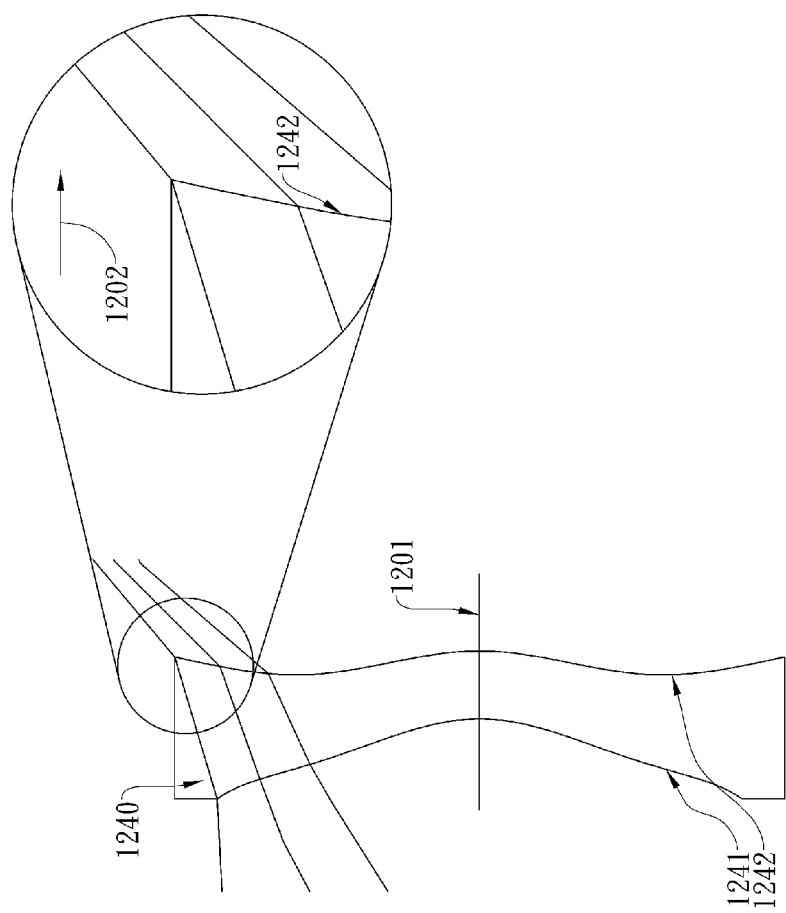
FIG. 12 shows the most peripheral region of the image-side surface of the fourth lens element within a maximum image height.

Please refer to FIG. 12, the image-side surface 1242 of the fourth lens element 1240 is inclined toward the image side 1202 of the imaging lens system at an end of a peripheral region of the image-side surface 1242 of the fourth lens element 1240 which within a location of a maximum effective radius thereof.

Figure 13:
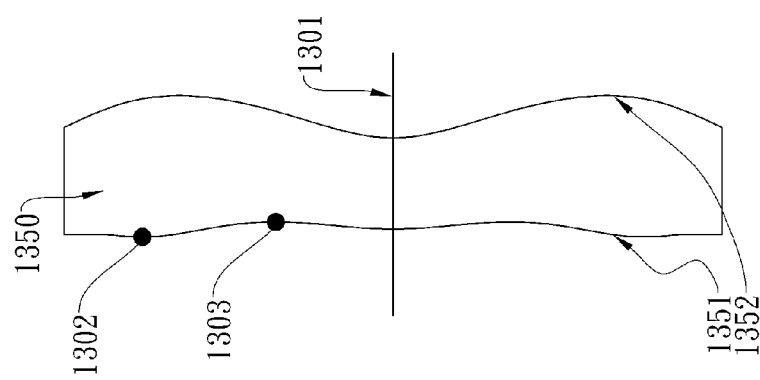
FIG. 13 shows the features of the object-side surface of the fifth lens element.

Please refer to FIG. 13, a critical point 1302, 1303 is a non-axial 1301 point of the object-side surface 1351 of the fifth lens element 1350 where its tangent is perpendicular to the optical axis 1301.

According to the above description of the present disclosure, the following 1st-11th specific embodiments are provided for further explanation.

1st Embodiment

FIG. 1A is a schematic view of an imaging lens system according to the 1st embodiment of the present disclosure. FIG. 1B shows spherical aberration curves, astigmatic field curves and a distortion curve of the imaging lens system according to the 1st embodiment. In FIG. 1A, the imaging lens system includes, in order from an object side to an image side, an aperture stop 100, a first lens element 110, a second lens element 120, a third lens element 130, a fourth lens element 140, a fifth lens element 150, an IR-cut filter 160, and an image plane 170.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with positive refractive power has a convex object-side surface 121 at a paraxial region, and a concave image-side surface 122 at a paraxial region, wherein the object-side surface 121 of the second lens element 120 changes from convex at the paraxial region to concave at a peripheral region and the image-side surface 122 of the second lens element 120 changes from concave at the paraxial region to convex at a peripheral region. The second lens element 120 is made of plastic material and has the object-side surface 121 and the image-side surface 122 being aspheric.

The third lens element 130 with positive refractive power has a concave object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a convex image-side surface 142. The fourth lens element 140 is made of plastic material and has the object-side surface 141 and the image-side surface 142 being aspheric.

The fifth lens element 150 with negative refractive power has a convex object-side surface 151 at a paraxial region and a concave image-side surface 152 at a paraxial region, wherein the object-side surface 151 of the fifth lens element 150 has at least two critical points and the image-side surface 152 of the fifth lens element 150 changes from concave at the paraxial region to convex at a peripheral region. The fifth lens element 150 is made of plastic material and has the object-side surface 151 and the image-side surface 152 being aspheric.

Among all of an axial distance between any two adjacent lens elements of the imaging lens system (that is T12, T23, T34, T45), and the axial distance between the second lens element 120 and the third lens element 130 which is T23 is the largest axial distance. Furthermore, the IR-cut filter 160 is made of glass material, wherein the IR-cut filter 160 is located between the fifth lens element 150 and the image plane 170, and will not affect the focal length of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

In the imaging lens system according to the 1st embodiment, when a focal length of the imaging lens system is f, an f-number of the imaging lens system is Fno, and half of the maximal field of view of the imaging lens system is HFOV, these parameters have the following values:

f=2.19 mm;
Fno=2.00; and
HFOV=35.4 degrees.

In the imaging lens system according to the 1st embodiment, when the focal length of the imaging lens system is f, and a focal length of the fourth lens element 140 is f4, the following relationship is satisfied:

$f/f4 = -0.370$.

In the imaging lens system according to the 1st embodiment, when the focal length of the imaging lens system is f, and a curvature radius of an object-side surface 121 of the second lens element 120 is R3, the following relationship is satisfied:

$f/R3 = 1.788$.

In the imaging lens system according to the 1st embodiment, when a focal length of the fifth lens element 150 is f5, and the focal length of the fourth lens element 140 is f4, the following relationship is satisfied:

$|f5/f4| = 0.367$.

In the imaging lens system according to the 1st embodiment, when a focal length of the third lens element 130 is f3, and a focal length of the second lens element 120 is f2, the following relationship is satisfied:

$f3/f2 = 0.048$.

In the imaging lens system according to the 1st embodiment, when an axial distance between the image-side surface 132 of the third lens element 130 and the object-side surface 151 of the fifth lens element 150 is Dr6r9, and a central thickness of the third lens element 130 is CT3, the following relationship is satisfied:

$Dr6r9/CT3 = 0.899$.

In the imaging lens system according to the 1st embodiment, when an Abbe number of the second lens element 120 is V2, an Abbe number of the fourth lens element 140 is V4, and an Abbe number of the first lens element 110 is V1, the following relationship is satisfied:

$(V2+V4)/V1 = 0.766$.

In the imaging lens system according to the 1st embodiment, when the focal length of the imaging lens system is f, and the focal length of the third lens element 130 is f3, the following relationship is satisfied:

$f/f3 = 1.888$.

In the imaging lens system according to the 1st embodiment, when the focal length of the imaging lens system is f, a focal length of the first lens element 110 is f1, and the focal length of the second lens element 120 is f2, the following relationship is satisfied:

$|f/f1| + |f/f2| = 0.617$.

The detailed optical data of the 1st embodiment are shown in Table 1 and the aspheric surface data are shown in Table 2 below.

TABLE 1

1st Embodiment
f = 2.19 mm, Fno = 2.00, HFOV = 35.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.144 | | | | |
| 2 | Lens 1 | 1.078 | (ASP) | 0.361 | Plastic | 1.544 | 55.9 | 4.17 |
| 3 | | 1.812 | (ASP) | 0.105 | | | | |
| 4 | Lens 2 | 1.225 | (ASP) | 0.237 | Plastic | 1.650 | 21.4 | 24.05 |
| 5 | | 1.228 | (ASP) | 0.222 | | | | |
| 6 | Lens 3 | −6.333 | (ASP) | 0.427 | Plastic | 1.544 | 55.9 | 1.16 |
| 7 | | −0.588 | (ASP) | 0.050 | | | | |
| 8 | Lens 4 | −0.538 | (ASP) | 0.304 | Plastic | 1.650 | 21.4 | −5.91 |
| 9 | | −0.765 | (ASP) | 0.030 | | | | |
| 10 | Lens 5 | 1.466 | (ASP) | 0.350 | Plastic | 1.544 | 55.9 | −2.17 |
| 11 | | 0.599 | (ASP) | 0.400 | | | | |
| 12 | IR-cut filter | Plano | | 0.200 | Glass | 1.517 | 64.2 | — |
| 13 | | Plano | | 0.276 | | | | |
| 14 | Image | Plano | | — | | | | |

Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | −4.4153E−02 | −4.8256E+00 | 1.1415E+00 | −2.4319E+00 | 9.9264E+00 |
| A4 = | −4.1997E−02 | −6.3326E−01 | −1.1478E+00 | −3.2834E−01 | −1.5123E−01 |
| A6 = | 4.1718E−01 | 7.3816E−01 | −9.0543E−01 | −1.1892E+00 | −1.0485E+00 |
| A8 = | −2.3012E+00 | −1.5234E+00 | 3.9056E−01 | 9.1483E−01 | 5.1733E+00 |
| A10 = | 7.2994E+00 | −1.8121E+00 | −1.6890E+00 | 1.1690E+01 | −5.3985E+00 |
| A12 = | −1.0769E+01 | 2.4602E+00 | 1.5018E+00 | −4.0126E+01 | −8.4995E+00 |
| A14 = | −1.4193E+00 | −1.0239E+01 | −1.7379E+01 | 3.1370E+01 | 3.8260E+01 |
| A16 = | | | | | −5.5416E+01 |

| | Surface # | | | | |
|---|---|---|---|---|---|
| | 7 | 8 | 9 | 10 | 11 |
| k = | −2.2460E+00 | −3.3103E+00 | −5.7968E+00 | −9.5831E−01 | −5.1473E+00 |
| A4 = | 1.2481E−01 | 5.5643E−01 | −1.7049E−01 | −1.5638E+00 | −6.0879E−01 |
| A6 = | −8.2893E−01 | −8.7712E−01 | 1.8863E+00 | 3.8763E+00 | 1.2074E+00 |
| A8 = | 2.8460E+00 | 4.4492E+00 | −5.2800E+00 | −7.8874E+00 | −1.9539E+00 |
| A10 = | −5.1132E+00 | −1.8033E+01 | 8.8627E+00 | 1.0984E+01 | 2.0523E+00 |
| A12 = | 6.2114E+00 | 3.6618E+01 | −8.3074E+00 | −8.9502E+00 | −1.3291E+00 |
| A14 = | 4.9928E−01 | −4.0234E+01 | 3.7572E+00 | 3.8484E+00 | 4.7857E−01 |
| A16 = | | 1.9446E+01 | −6.0389E−01 | −6.7919E−01 | −7.2324E−02 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2A:
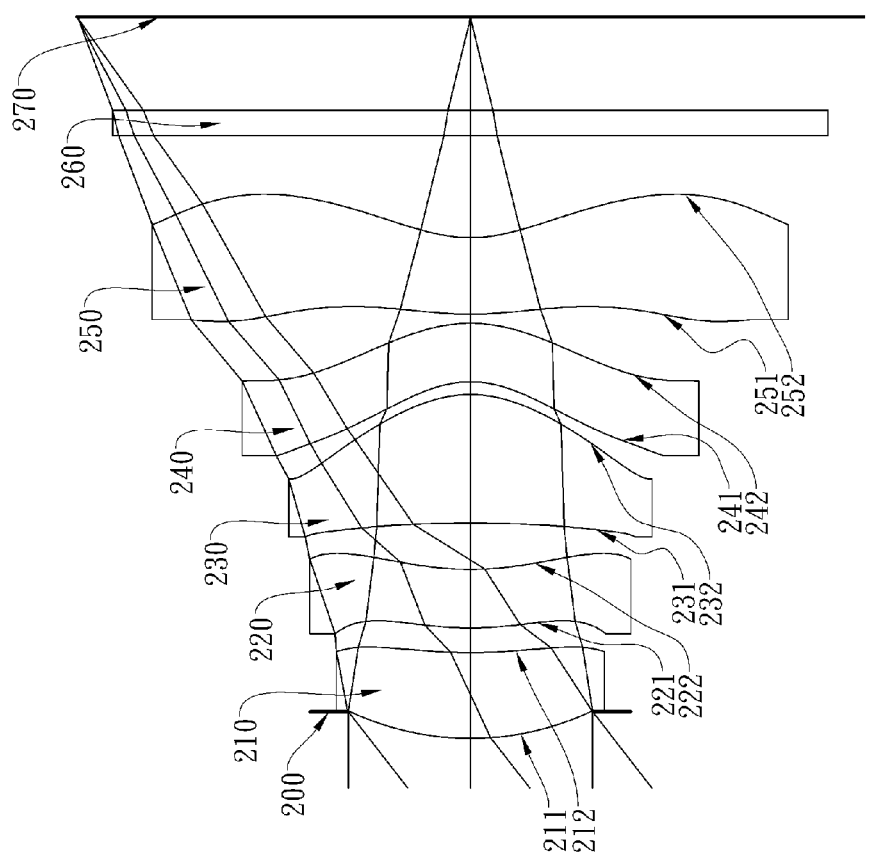
FIG. 2A is a schematic view of an imaging lens system according to the 2nd embodiment of the present disclosure.
Figure 2B:
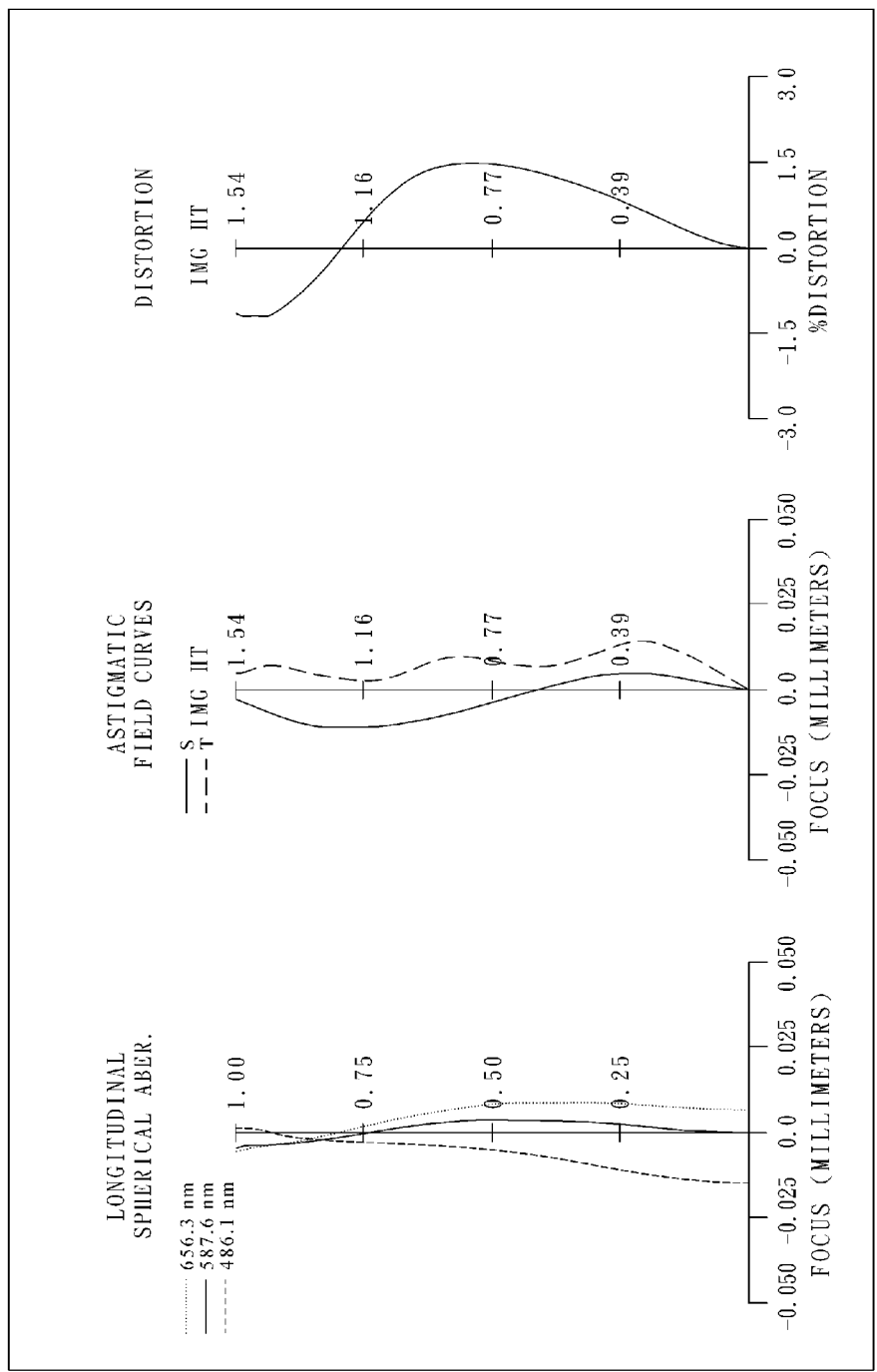
FIG. 2B shows spherical aberration curves, astigmatic field curves and a distortion curve of the imaging lens system according to the 2nd embodiment.

FIG. 2A is a schematic view of an imaging lens system according to the 2nd embodiment of the present disclosure. FIG. 2B shows spherical aberration curves, astigmatic field curves and a distortion curve of the imaging lens system according to the 2nd embodiment. In FIG. 2A, the imaging lens system includes, in order from an object side to an image side, an aperture stop 200, a first lens element 210, a second lens element 220, a third lens element 230, a fourth lens element 240, a fifth lens element 250, an IR-cut filter 260, and an image plane 270.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with positive refractive power has a convex object-side surface 221 at a paraxial region, and a concave image-side surface 222 at a paraxial region, wherein the object-side surface 221 of the second lens element 220 changes from convex at the paraxial region to concave at a peripheral region and the image-side surface 222 of the second lens element 220 changes from concave at the paraxial region to convex at a peripheral region. The second lens element 220 is made of plastic material and has the object-side surface 221 and the image-side surface 222 being aspheric.

The third lens element 230 with positive refractive power has a concave object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a convex image-side surface 242. The fourth lens element 240 is made of plastic material and has the object-side surface 241 and the image-side surface 242 being aspheric.

The fifth lens element 250 with negative refractive power has a convex object-side surface 251 at a paraxial region and a concave image-side surface 252 at a paraxial region, wherein the object-side surface 251 of the fifth lens element 250 has at least two critical points and the image-side surface 252 of the fifth lens element 250 changes from concave at the paraxial region to convex at a peripheral region. The fifth lens element 250 is made of plastic material and has the object-side surface 251 and the image-side surface 252 being aspheric.

Among all of an axial distance between any two adjacent lens elements of the imaging lens system (that is T12, T23, T34, T45), and the axial distance between the second lens element 220 and the third lens element 230 which is T23 is the largest axial distance. Furthermore, the IR-cut filter 260 is made of glass material, wherein the IR-cut filter 260 is located between the fifth lens element 250 and the image plane 270, and will not affect the focal length of the imaging lens system.

The detailed optical data of the 2nd embodiment are shown in Table 3 and the aspheric surface data are shown in Table 4 below.

TABLE 3

2nd Embodiment
f = 2.01 mm, Fno = 2.10, HFOV = 37.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.105 | | | | |
| 2 | Lens 1 | 1.097 | (ASP) | 0.336 | Plastic | 1.544 | 55.9 | 4.27 |
| 3 | | 1.853 | (ASP) | 0.097 | | | | |
| 4 | Lens 2 | 1.247 | (ASP) | 0.230 | Plastic | 1.640 | 23.3 | 57.00 |
| 5 | | 1.198 | (ASP) | 0.181 | | | | |
| 6 | Lens 3 | −5.922 | (ASP) | 0.505 | Plastic | 1.544 | 55.9 | 0.91 |
| 7 | | −0.470 | (ASP) | 0.050 | | | | |
| 8 | Lens 4 | −0.397 | (ASP) | 0.230 | Plastic | 1.640 | 23.3 | −4.74 |
| 9 | | −0.560 | (ASP) | 0.035 | | | | |
| 10 | Lens 5 | 1.390 | (ASP) | 0.300 | Plastic | 1.535 | 55.7 | −1.88 |
| 11 | | 0.539 | (ASP) | 0.400 | | | | |
| 12 | IR-cut filter | Plano | | 0.100 | Glass | 1.517 | 64.2 | — |
| 13 | | Plano | | 0.366 | | | | |
| 14 | Image | Plano | | — | | | | |

Reference wavelength (d-line) is 587.6 nm.

TABLE 4

Aspheric Coefficients

| | Surface # | | | | |
|---|---|---|---|---|---|
| | 2 | 3 | 4 | 5 | 6 |
| k = | −6.6312E−02 | −1.2501E+01 | −1.7941E−01 | −1.5925E+00 | −3.0000E+01 |
| A4 = | −4.0346E−02 | −6.3188E−01 | −1.2762E+00 | −3.8821E−01 | −1.0237E−02 |
| A6 = | 4.3541E−01 | 5.3753E−01 | −1.1292E+00 | −1.6169E+00 | −1.2814E+00 |
| A8 = | −2.8170E+00 | −3.6760E+00 | −1.9135E+00 | 1.8022E+00 | 5.3858E+00 |
| A10 = | 1.0046E+01 | 2.2726E+00 | 6.0791E−01 | 1.2536E+01 | −5.3728E+00 |
| A12 = | −2.0570E+01 | −6.9744E+00 | −4.8083E−01 | −4.4644E+01 | −1.0121E+01 |
| A14 = | −1.4193E+00 | −1.0239E+01 | −1.7379E+01 | 3.1370E+01 | 3.8260E+01 |
| A16 = | | | | | −5.5416E+01 |

| | Surface # | | | | |
|---|---|---|---|---|---|
| | 7 | 8 | 9 | 10 | 11 |
| k = | −2.0775E+00 | −2.2847E+00 | −3.7170E+00 | −1.0892E+00 | −4.8361E+00 |
| A4 = | 1.8753E−01 | 7.2886E−01 | −1.8633E+00 | −1.5726E+00 | −6.3402E−01 |
| A6 = | −9.0888E−01 | −8.3712E−01 | 2.0475E+00 | 3.8721E+00 | 1.2213E+00 |
| A8 = | 2.5281E+00 | 4.2414E+00 | −5.1993E+00 | −7.8969E+00 | −1.9580E+00 |
| A10 = | −5.6207E+00 | −1.8083E+01 | 8.7730E+00 | 1.0992E+01 | 2.0431E+00 |
| A12 = | 6.2164E+00 | 3.6895E+01 | −8.4976E+00 | −8.9456E+00 | −1.3226E+00 |
| A14 = | 3.6163E+00 | −4.0157E+01 | 3.6688E+00 | 3.8481E+00 | 4.8270E−01 |
| A16 = | | 1.9217E+01 | −4.1344E−01 | −6.8109E−01 | −7.4915E−02 |

In the imaging lens system according to the 2nd embodiment, the definitions of are the same as those stated in the 1st embodiment with corresponding values for the 2nd embodiment. Moreover, these parameters can be calculated from Table 3 and Table 4 as the following values and satisfy the following relationships:

| f [mm] | 2.01 | f3/f2 | 0.016 |
|---|---|---|---|
| Fno | 2.10 | Dr6r9/CT3 | 0.624 |
| HFOV [deg.] | 37.8 | (V2 + V4)/V1 | 0.834 |
| f/f4 | −0.424 | f/f3 | 2.221 |
| f/R3 | 1.612 | |f/f1| + |f/f2| | 0.506 |
| |f5/f4| | 0.396 | | |

3rd Embodiment

Figure 3A:
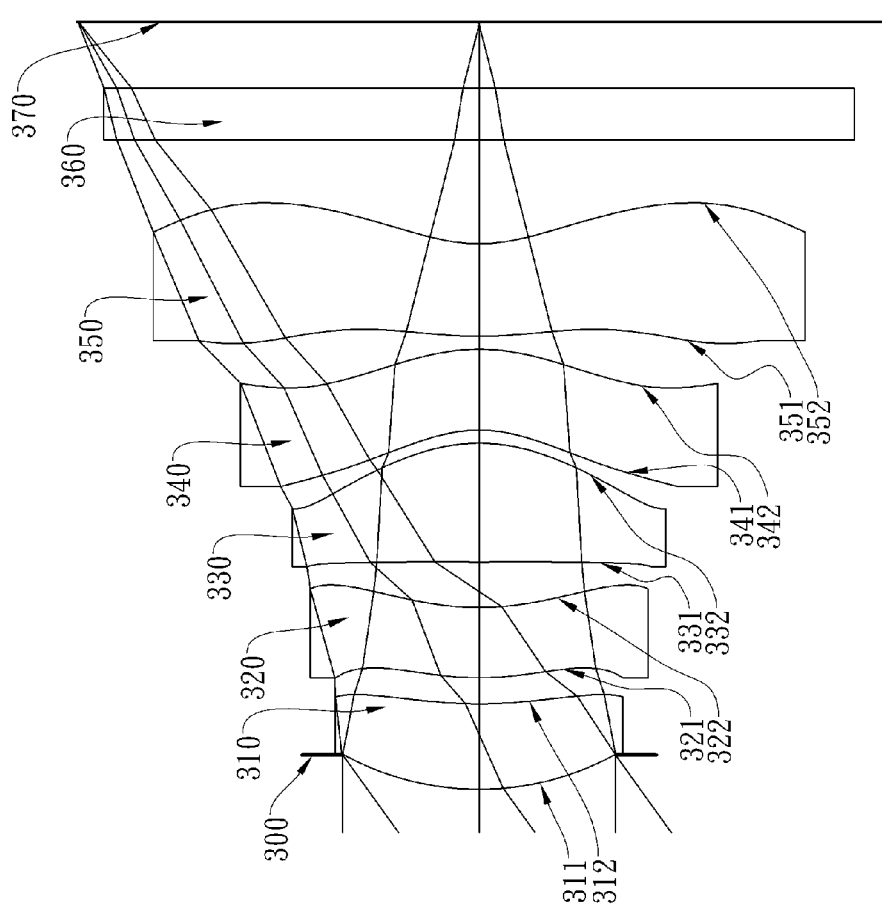
FIG. 3A is a schematic view of an imaging lens system according to the 3rd embodiment of the present disclosure.
Figure 3B:
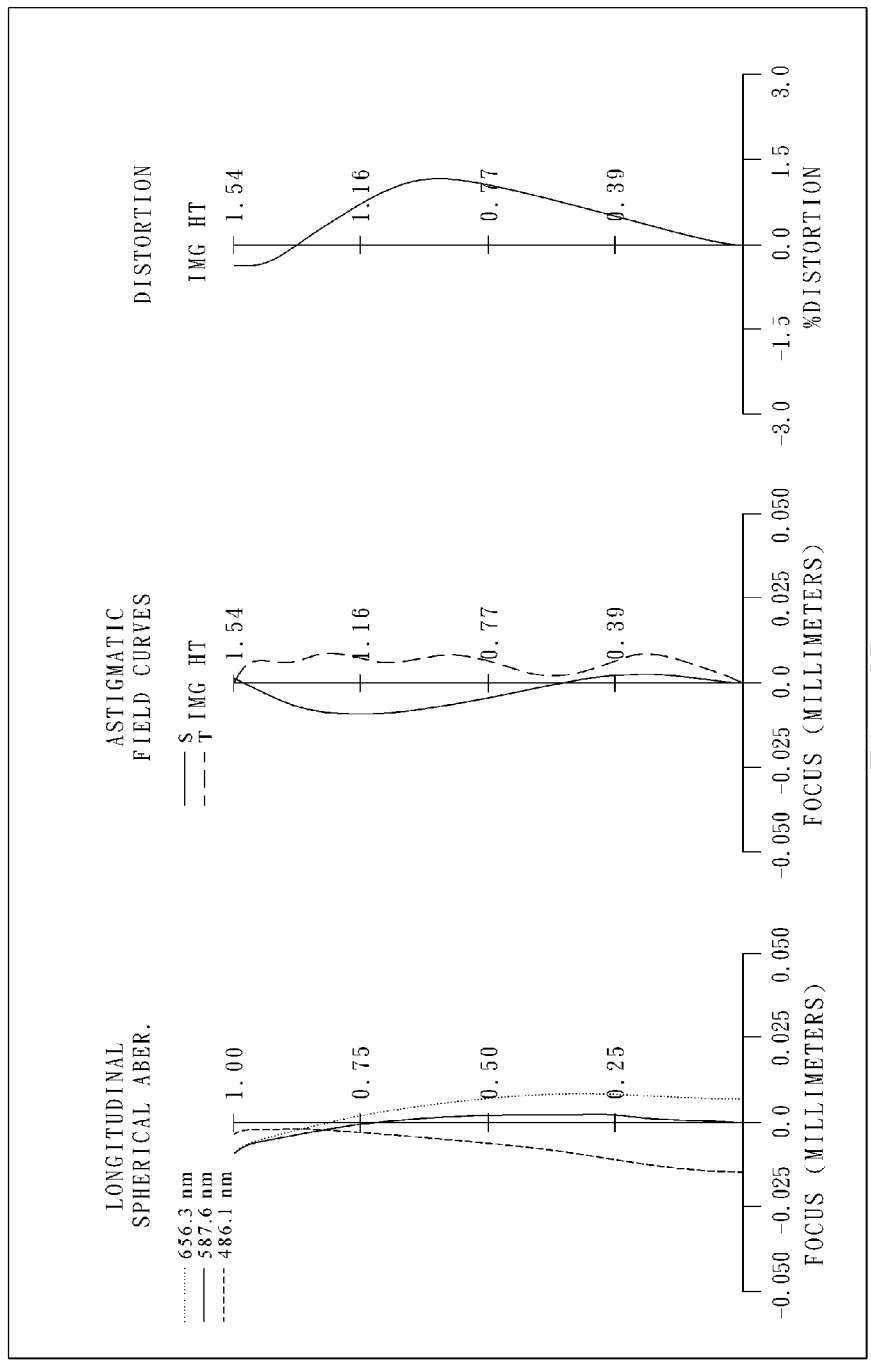
FIG. 3B shows spherical aberration curves, astigmatic field curves and a distortion curve of the imaging lens system according to the 3rd embodiment.

FIG. 3A is a schematic view of an imaging lens system according to the 3rd embodiment of the present disclosure. FIG. 3B shows spherical aberration curves, astigmatic field curves and a distortion curve of the imaging lens system according to the 3rd embodiment. In FIG. 3A, the imaging lens system includes, in order from an object side to an image side, an aperture stop 300, a first lens element 310, a second lens element 320, a third lens element 330, a fourth lens element 340, a fifth lens element 350, an IR-cut filter 360, and an image plane 370.

The first lens element 310 with positive refractive power has a convex object-side surface 311 and a concave image-side surface 312. The first lens element 310 is made of plastic material and has the object-side surface 311 and the image-side surface 312 being aspheric.

The second lens element 320 with positive refractive power has a convex object-side surface 321 at a paraxial region, and a concave image-side surface 322 at a paraxial region, wherein the object-side surface 321 of the second lens element 320 changes from convex at the paraxial region to concave at a peripheral region and the image-side surface 322 of the second lens element 320 changes from concave at the paraxial region to convex at a peripheral region. The second lens element 320 is made of plastic material and has the object-side surface 321 and the image-side surface 322 being aspheric.

The third lens element 330 with positive refractive power has a convex object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a convex image-side surface 342, wherein the image-side surface 342 of the fourth lens element 340 is inclined toward the image side of the imaging lens system at an end of a peripheral region of the image-side surface 342 of the fourth lens element 340 which within a location of a maximum effective radius thereof. The fourth lens element 340 is made of plastic material and has the object-side surface 341 and the image-side surface 342 being aspheric.

The fifth lens element 350 with negative refractive power has a convex object-side surface 351 at a paraxial region and a concave image-side surface 352 at a paraxial region, wherein the object-side surface 351 of the fifth lens element 350 has at least two critical points and the image-side surface 352 of the fifth lens element 350 changes from concave at the paraxial region to convex at a peripheral region. The fifth lens element 350 is made of plastic material and has the object-side surface 351 and the image-side surface 352 being aspheric.

Among all of an axial distance between any two adjacent lens elements of the imaging lens system (that is T12, T23, T34, T45), and the axial distance between the second lens element 320 and the third lens element 330 which is T23 is the largest axial distance. Furthermore, the IR-cut filter 360 is made of glass material, wherein the IR-cut filter 360 is located between the fifth lens element 350 and the image plane 370, and will not affect the focal length of the imaging lens system.

The detailed optical data of the 3rd embodiment are shown in Table 5 and the aspheric surface data are shown in Table 6 below.

TABLE 5

3rd Embodiment
f = 2.15 mm, Fno = 2.05, HFOV = 35.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.132 | | | | |
| 2 | Lens 1 | 1.087 | (ASP) | 0.329 | Plastic | 1.570 | 58.2 | 4.78 |
| 3 | | 1.610 | (ASP) | 0.101 | | | | |
| 4 | Lens 2 | 1.128 | (ASP) | 0.271 | Plastic | 1.607 | 26.6 | 42.96 |
| 5 | | 1.072 | (ASP) | 0.175 | | | | |
| 6 | Lens 3 | 78.524 | (ASP) | 0.459 | Plastic | 1.570 | 58.2 | 1.14 |
| 7 | | −0.653 | (ASP) | 0.050 | | | | |
| 8 | Lens 4 | −0.533 | (ASP) | 0.312 | Plastic | 1.634 | 23.8 | −6.26 |
| 9 | | −0.755 | (ASP) | 0.050 | | | | |
| 10 | Lens 5 | 1.480 | (ASP) | 0.357 | Plastic | 1.544 | 55.9 | −2.27 |
| 11 | | 0.616 | (ASP) | 0.400 | | | | |
| 12 | IR-cut filter | Plano | | 0.200 | Glass | 1.517 | 64.2 | — |
| 13 | | Plano | | 0.255 | | | | |
| 14 | Image | Plano | | — | | | | |

Reference wavelength (d-line) is 587.6 nm.

TABLE 6

Aspheric Coefficients

| | Surface # | | | | |
|---|---|---|---|---|---|
| | 2 | 3 | 4 | 5 | 6 |
| k = | −4.7891E−02 | −1.0443E+01 | 6.8897E−01 | −2.1158E+00 | −1.0000E+00 |
| A4 = | −5.2861E−02 | −5.4424E−01 | −1.3358E+00 | −3.0531E−01 | −2.7231E−02 |
| A6 = | 5.4715E−01 | 9.1998E−01 | −5.8753E−01 | −1.1267E+00 | −9.4580E−01 |
| A8 = | −2.4503E+00 | −2.2483E+00 | 6.7419E−02 | 1.0666E+00 | 4.4591E+00 |
| A10 = | 7.3519E+00 | −4.0218E−01 | −2.2035E+00 | 1.1603E+01 | −5.4988E+00 |
| A12 = | −1.0550E+01 | −1.9990E+00 | −2.0967E+00 | −4.1186E+01 | −7.7543E+00 |
| A14 = | −1.4193E+00 | −1.0239E+01 | −1.7379E+01 | 3.1370E+01 | 3.8260E+01 |
| A16 = | | | | | −5.5416E+01 |

TABLE 6-continued

Aspheric Coefficients

Surface #

| | 7 | 8 | 9 | 10 | 11 |
|---|---|---|---|---|---|
| k = | −2.5279E+00 | −3.3825E+00 | −5.5060E+00 | −1.1170E+00 | −5.2354E+00 |
| A4 = | 1.3049E−01 | 5.6070E−01 | −1.1960E−01 | −1.5646E+00 | −6.0958E−01 |
| A6 = | −8.8512E−01 | −8.6547E−01 | 1.9613E+00 | 3.8883E+00 | 1.2139E+00 |
| A8 = | 2.7468E+00 | 4.4067E+00 | −5.2937E+00 | −7.8770E+00 | −1.9621E+00 |
| A10 = | −5.2213E+00 | −1.7889E+01 | 8.8008E+00 | 1.0981E+01 | 2.0609E+00 |
| A12 = | 6.1584E+00 | 3.6652E+01 | −8.3551E+00 | −8.9568E+00 | −1.3308E+00 |
| A14 = | 8.7041E−01 | −4.0057E+01 | 3.7607E+00 | 3.8446E+00 | 4.7657E−01 |
| A16 = | | 1.9268E+01 | −5.4226E−01 | −6.7491E−01 | −7.1591E−02 |

In the imaging lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| f [mm] | 2.15 | f3/f2 | 0.026 |
|---|---|---|---|
| Fno | 2.05 | Dr6r9/CT3 | 0.898 |
| HFOV [deg.] | 35.7 | (V2 + V4)/V1 | 0.866 |
| f/f4 | −0.344 | f/f3 | 1.894 |
| f/R3 | 1.910 | |f/f1| + |f/f2| | 0.501 |
| |f5/f4| | 0.363 | | |

4th Embodiment

Figure 4A:
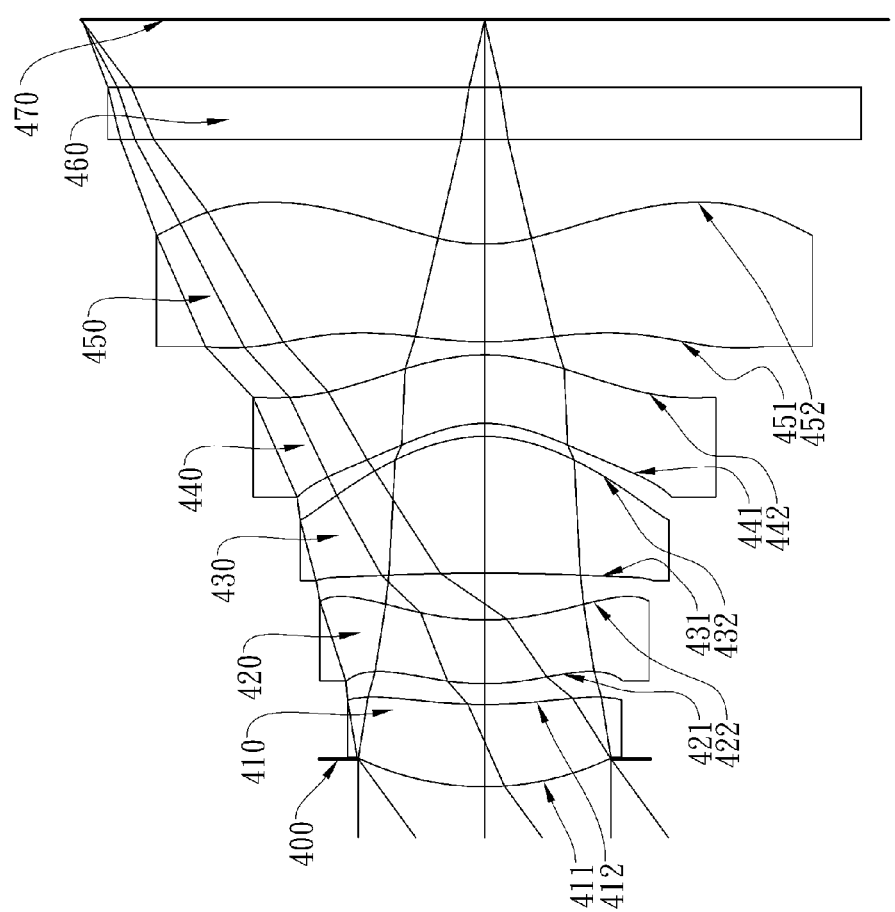
FIG. 4A is a schematic view of an imaging lens system according to the 4th embodiment of the present disclosure.
Figure 4B:
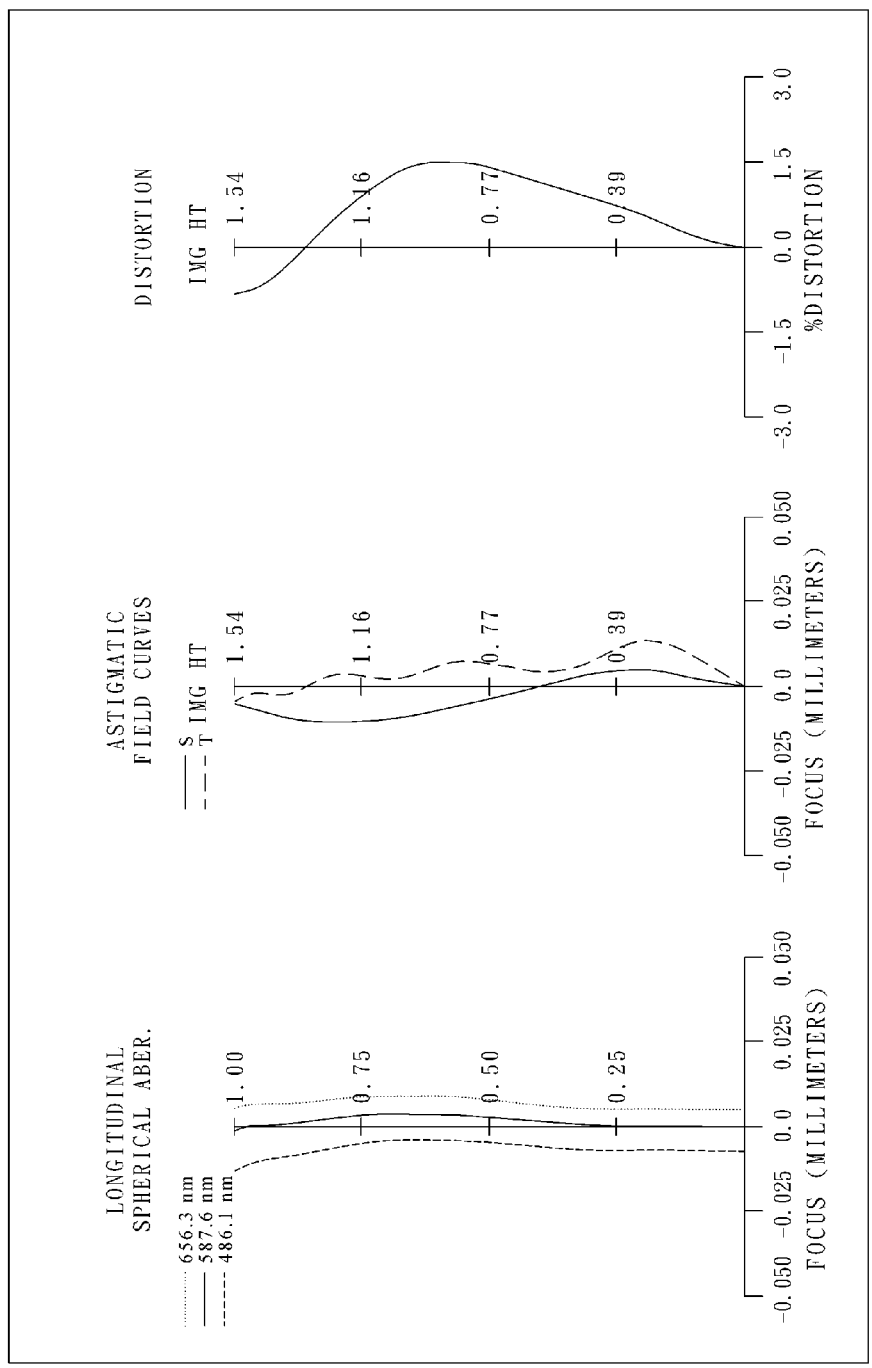
FIG. 4B shows spherical aberration curves, astigmatic field curves and a distortion curve of the imaging lens system according to the 4th embodiment.

FIG. 4A is a schematic view of an imaging lens system according to the 4th embodiment of the present disclosure. FIG. 4B shows spherical aberration curves, astigmatic field curves and a distortion curve of the imaging lens system according to the 4th embodiment. In FIG. 4A, the imaging lens system includes, in order from an object side to an image side, an aperture stop 400, a first lens element 410, a second lens element 420, a third lens element 430, a fourth lens element 440, a fifth lens element 450, an IR-cut filter 460, and an image plane 470.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with positive refractive power has a convex object-side surface 421 at a paraxial region, and a concave image-side surface 422 at a paraxial region, wherein the object-side surface 421 of the second lens element 420 changes from convex at the paraxial region to concave at a peripheral region and the image-side surface 422 of the second lens element 420 changes from concave at the paraxial region to convex at a peripheral region. The second lens element 420 is made of plastic material and has the object-side surface 421 and the image-side surface 422 being aspheric.

The third lens element 430 with positive refractive power has a concave object-side surface 431 and a convex image-side surface 432. The third lens element 430 is made of plastic material and has the object-side surface 431 and the image-side surface 432 being aspheric.

The fourth lens element 440 with negative refractive power has a concave object-side surface 441 and a convex image-side surface 442, wherein the image-side surface 442 of the fourth lens element 440 is inclined toward the image side of the imaging lens system at an end of a peripheral region of the image-side surface 442 of the fourth lens element 440 which within a location of a maximum effective radius thereof. The fourth lens element 440 is made of plastic material and has the object-side surface 441 and the image-side surface 442 being aspheric.

The fifth lens element 450 with negative refractive power has a convex object-side surface 451 at a paraxial region and a concave image-side surface 452 at a paraxial region, wherein the object-side surface 451 of the fifth lens element 450 has at least two critical points and the image-side surface 452 of the fifth lens element 450 changes from concave at the paraxial region to convex at a peripheral region. The fifth lens element 450 is made of plastic material and has the object-side surface 451 and the image-side surface 452 being aspheric.

Among all of an axial distance between any two adjacent lens elements of the imaging lens system (that is T12, T23, T34, T45), and the axial distance between the second lens element 420 and the third lens element 430 which is T23 is the largest axial distance. Furthermore, the IR-cut filter 460 is made of glass material, wherein the IR-cut filter 460 is located between the fifth lens element 450 and the image plane 470, and will not affect the focal length of the imaging lens system.

The detailed optical data of the 4th embodiment are shown in Table 7 and the aspheric surface data are shown in Table 8 below.

TABLE 7

4th Embodiment
f = 2.12 mm, Fno = 2.20, HFOV = 36.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.106 | | | | |
| 2 | Lens 1 | 1.108 | (ASP) | 0.314 | Plastic | 1.544 | 55.9 | 5.74 |

TABLE 7-continued

4th Embodiment
f = 2.12 mm, Fno = 2.20, HFOV = 36.2 deg.

| Surface # | | Curvature Radius | | Thickness | Material | Index | Abbe # | Focal length |
|---|---|---|---|---|---|---|---|---|
| 3 | | 1.547 | (ASP) | 0.080 | | | | |
| 4 | Lens 2 | 0.917 | (ASP) | 0.244 | Plastic | 1.544 | 55.9 | 9.18 |
| 5 | | 1.018 | (ASP) | 0.178 | | | | |
| 6 | Lens 3 | −11.586 | (ASP) | 0.524 | Plastic | 1.544 | 55.9 | 1.11 |
| 7 | | −0.584 | (ASP) | 0.050 | | | | |
| 8 | Lens 4 | −0.478 | (ASP) | 0.262 | Plastic | 1.650 | 21.4 | −3.48 |
| 9 | | −0.737 | (ASP) | 0.050 | | | | |
| 10 | Lens 5 | 1.297 | (ASP) | 0.373 | Plastic | 1.544 | 55.9 | −2.76 |
| 11 | | 0.626 | (ASP) | 0.400 | | | | |
| 12 | IR-cut filter | Plano | | 0.200 | Glass | 1.517 | 64.2 | — |
| 13 | | Plano | | 0.259 | | | | |
| 14 | Image | Plano | | — | | | | |

Reference wavelength (d-line) is 587.6 nm.

TABLE 8

Aspheric Coefficients

| | Surface # | | | | |
|---|---|---|---|---|---|
| | 2 | 3 | 4 | 5 | 6 |
| k = | −3.2279E−02 | −2.0192E+01 | −1.0959E+00 | −9.9339E−01 | −3.0000E+01 |
| A4 = | −5.6548E−02 | −5.5303E−01 | −1.4501E+00 | −2.9478E−01 | −3.8470E−02 |
| A6 = | 5.6567E−01 | 9.4222E−01 | −2.5585E−02 | −1.8357E+00 | −7.5644E−01 |
| A8 = | −2.5754E+00 | −3.7227E+00 | −2.6121E+00 | 1.5877E+00 | 5.0118E+00 |
| A10 = | 7.2142E+00 | 1.3948E+00 | −1.5020E+00 | 1.4332E+01 | −5.8992E+00 |
| A12 = | −1.2894E+01 | −8.1168E+00 | −1.2137E+01 | −4.9117E+01 | −1.1412E+01 |
| A14 = | −1.4193E+00 | −1.0239E+01 | −1.7379E+01 | 3.1370E+01 | 3.8260E+01 |
| A16 = | | | | | −5.5416E+01 |

| | Surface # | | | | |
|---|---|---|---|---|---|
| | 7 | 8 | 9 | 10 | 11 |
| k = | −2.3596E+00 | −3.1826E+00 | −5.5694E+00 | −1.8419E+00 | −4.8705E+00 |
| A4 = | 7.4780E−02 | 5.1557E−01 | −1.3518E−01 | −1.5935E+00 | −6.1311E−01 |
| A6 = | −9.2601E−01 | −9.7006E−01 | 1.9014E+00 | 3.9097E+00 | 1.2043E+00 |
| A8 = | 2.6869E+00 | 4.2016E+00 | −5.2751E+00 | −7.8812E+00 | −1.9542E+00 |
| A10 = | −5.5622E+00 | −1.7964E+01 | 8.8262E+00 | 1.0981E+01 | 2.0558E+00 |
| A12 = | 5.7106E+00 | 3.7156E+01 | −8.3489E+00 | −8.9555E+00 | −1.3300E+00 |
| A14 = | 7.2285E−01 | −4.0348E+01 | 3.7305E+00 | 3.8469E+00 | 4.7708E−01 |
| A16 = | | 1.5225E+01 | −5.2384E−01 | −6.7666E−01 | −7.1738E−02 |

In the imaging lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f [mm] | 2.12 | f3/f2 | 0.121 |
|---|---|---|---|
| Fno | 2.20 | Dr6r9/CT3 | 0.691 |
| HFOV [deg.] | 36.2 | (V2 + V4)/V1 | 1.383 |
| f/f4 | −0.610 | f/f3 | 1.912 |
| f/R3 | 2.318 | |f/f1| + |f/f2| | 0.603 |
| |f5/f4| | 0.794 | | |

5th Embodiment

Figure 5A:
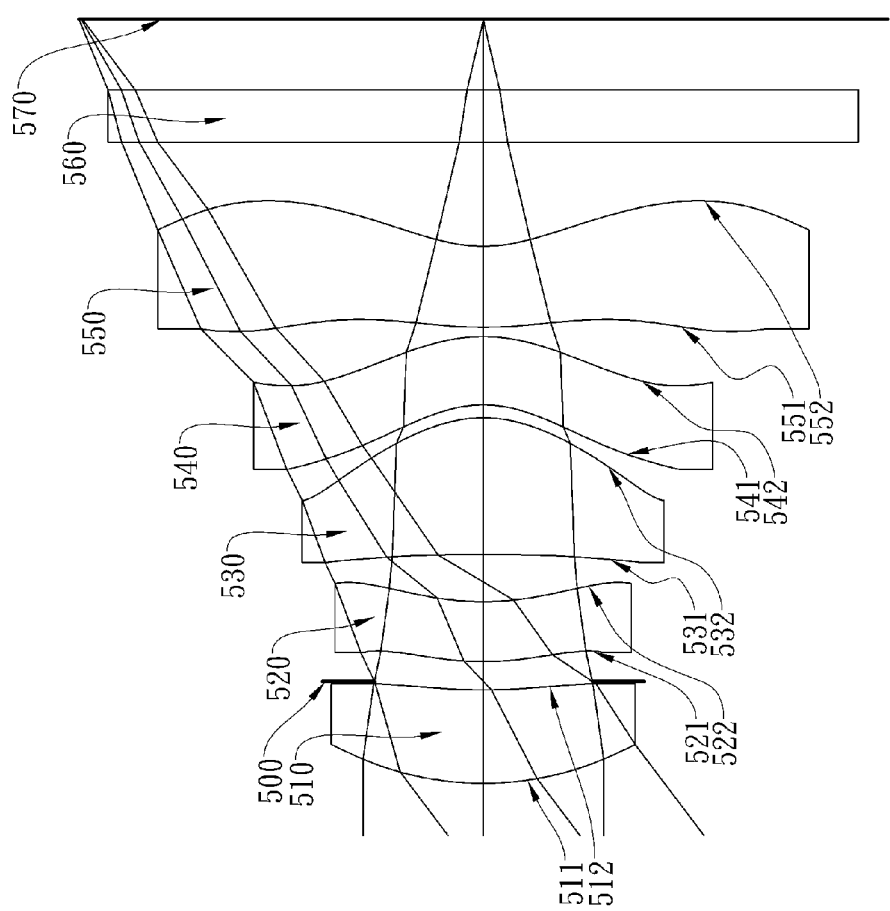
FIG. 5A is a schematic view of an imaging lens system according to the 5th embodiment of the present disclosure.
Figure 5B:
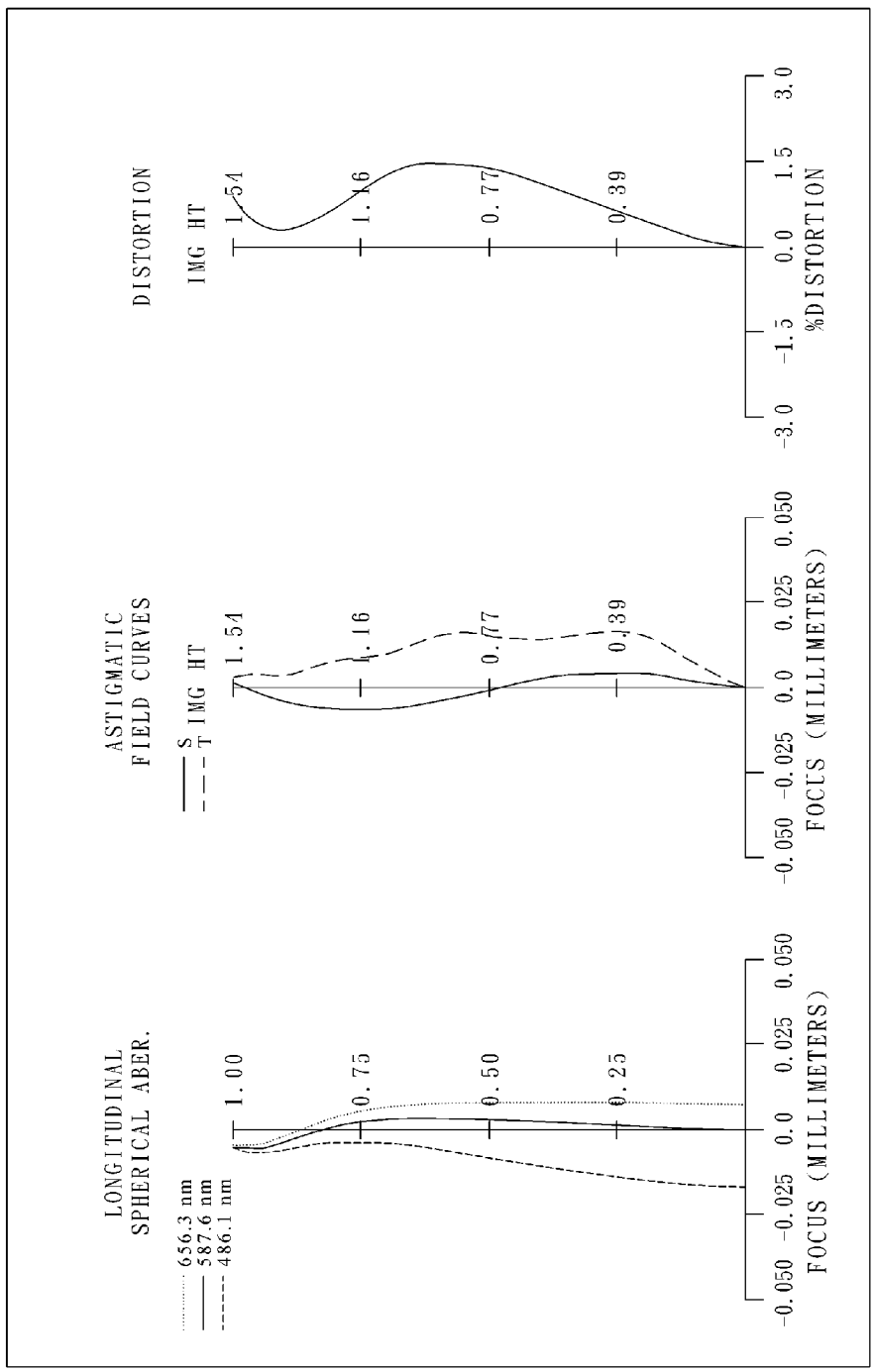
FIG. 5B shows spherical aberration curves, astigmatic field curves and a distortion curve of the imaging lens system according to the 5th embodiment.

FIG. 5A is a schematic view of an imaging lens system according to the 5th embodiment of the present disclosure. FIG. 5B shows spherical aberration curves, astigmatic field curves and a distortion curve of the imaging lens system according to the 5th embodiment. In FIG. 5A, the imaging lens system includes, in order from an object side to an image side, a first lens element 510, an aperture stop 500, a second lens element 520, a third lens element 530, a fourth lens element 540, a fifth lens element 550, an IR-cut filter 560, and an image plane 570.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with positive refractive power has a convex object-side surface 521 at a paraxial region, and a concave image-side surface 522 at a paraxial region, wherein the object-side surface 521 of the second lens element 520 changes from convex at the paraxial region to concave at a peripheral region and the image-side surface 522 of the second lens element 520 changes from concave at the paraxial region to convex at a peripheral region. The second lens element 520 is made of plastic material and has the object-side surface 521 and the image-side surface 522 being aspheric.

The third lens element 530 with positive refractive power has a concave object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542, wherein the image-side surface 542 of the fourth lens element 540 is inclined toward the image side of the imaging lens system at an end of a peripheral region of the image-side surface 542 of the fourth lens element 540 which within a location of a maximum effective radius thereof. The fourth lens element 540 is made of plastic material and has the object-side surface 541 and the image-side surface 542 being aspheric.

The fifth lens element 550 with negative refractive power has a convex object-side surface 551 at a paraxial region and a concave image-side surface 552 at a paraxial region, wherein the object-side surface 551 of the fifth lens element 550 has at least two critical points and the image-side surface 552 of the fifth lens element 550 changes from concave at the paraxial region to convex at a peripheral region. The fifth lens element 550 is made of plastic material and has the object-side surface 551 and the image-side surface 552 being aspheric Among all of an axial distance between any two adjacent lens elements of the imaging lens system (that is T12, T23, T34, T45), and the axial distance between the second lens element 520 and the third lens element 530 which is T23 is the largest axial distance. Furthermore, the IR-cut filter 560 is made of glass material, wherein the IR-cut filter 560 is located between the fifth lens element 550 and the image plane 570, and will not affect the focal length of the imaging lens system.

The detailed optical data of the 5th embodiment are shown in Table 9 and the aspheric surface data are shown in Table 10 below.

TABLE 9

5th Embodiment
f = 2.03 mm, Fno = 2.20, HFOV = 37.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.188 | (ASP) | 0.358 | Plastic | 1.535 | 55.7 | 4.83 |
| 2 | | 1.968 | (ASP) | 0.033 | | | | |
| 3 | Ape. Stop | Plano | | 0.076 | | | | |
| 4 | Lens 2 | 1.065 | (ASP) | 0.230 | Plastic | 1.640 | 23.3 | 29.18 |
| 5 | | 1.034 | (ASP) | 0.181 | | | | |
| 6 | Lens 3 | −9.046 | (ASP) | 0.525 | Plastic | 1.544 | 55.9 | 0.97 |
| 7 | | −0.507 | (ASP) | 0.050 | | | | |
| 8 | Lens 4 | −0.450 | (ASP) | 0.262 | Plastic | 1.650 | 23.3 | −6.29 |
| 9 | | −0.622 | (ASP) | 0.035 | | | | |
| 10 | Lens 5 | 1.421 | (ASP) | 0.311 | Plastic | 1.535 | 55.7 | −1.89 |
| 11 | | 0.546 | (ASP) | 0.400 | | | | |
| 12 | IR-cut filter | Plano | | 0.200 | Glass | 1.517 | 64.2 | — |
| 13 | | Plano | | 0.273 | | | | |
| 14 | Image | Plano | | — | | | | |

Reference wavelength (d-line) is 587.6 nm.

TABLE 10

Aspheric Coefficients

| | Surface # | | | | |
|---|---|---|---|---|---|
| | 1 | 2 | 4 | 5 | 6 |
| k = | −5.1590E−02 | −2.0127E+01 | −2.3943E−01 | −2.0865E+00 | 1.4659E+01 |
| A4 = | −4.6095E−02 | −5.8386E−01 | −1.3129E+00 | −4.1154E−01 | −5.5136E−02 |
| A6 = | 5.2780E−01 | 1.2792E+00 | −5.1193E−01 | −1.4491E+00 | −1.0795E+00 |
| A8 = | −2.9520E+00 | −3.1655E+00 | −1.2345E+00 | 1.6421E+00 | 5.4072E+00 |
| A10 = | 1.0183E+01 | −5.6596E+00 | 1.1548E+00 | 1.1077E+01 | −5.8592E+00 |
| A12 = | −1.6951E+01 | 2.1611E+01 | −1.2630E+01 | −4.5951E+01 | −1.0264E+01 |
| A14 = | 2.2180E+00 | −1.0239E+01 | −1.7379E+01 | 3.1370E+01 | 3.8260E+01 |
| A16 = | | | | | −5.5416E+01 |

| | Surface # | | | | |
|---|---|---|---|---|---|
| | 7 | 8 | 9 | 10 | 11 |
| k = | −1.9714E+00 | −2.4259E+00 | −4.2623E+00 | −7.8534E−01 | −4.9100E+00 |
| A4 = | 2.0031E−01 | 7.1182E−01 | −1.8103E−01 | −1.5574E+00 | −6.1083E−01 |
| A6 = | −9.0087E−01 | −8.3586E−01 | 2.0694E+00 | 3.8751E+00 | 1.2072E+00 |
| A8 = | 2.4958E+00 | 4.2949E+00 | −5.1897E+00 | −7.9026E+00 | −1.9532E+00 |
| A10 = | −5.6701E+00 | −1.8005E+01 | 8.7680E+00 | 1.0982E+01 | 2.0464E+00 |
| A12 = | 6.2950E+00 | 3.6969E+01 | −8.5067E+00 | −8.9442E+00 | −1.3255E+00 |
| A14 = | 4.1486E+00 | −4.0129E+01 | 3.6683E+00 | 3.8520E+00 | 4.8099E−01 |
| A16 = | | 1.9049E+01 | −3.8536E−01 | −6.8154E−01 | −7.3867E−02 |

In the imaging lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f [mm] | 2.03 | f3/f2 | 0.033 |
| Fno | 2.20 | Dr6r9/CT3 | 0.661 |
| HFOV [deg.] | 37.0 | (V2 + V4)/V1 | 0.837 |
| f/f4 | −0.323 | f/f3 | 2.100 |
| f/R3 | 1.906 | |f/f1| + |f/f2| | 0.490 |
| |f5/f4| | 0.301 | | |

6th Embodiment

Figure 6A:
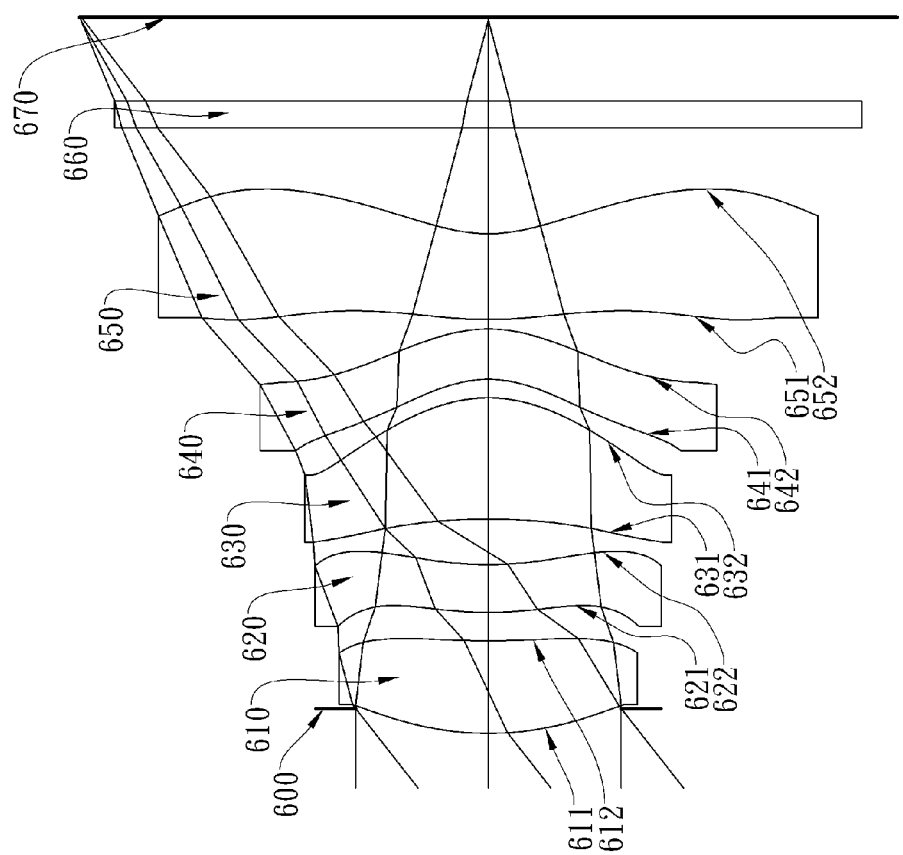
FIG. 6A is a schematic view of an imaging lens system according to the 6th embodiment of the present disclosure.
Figure 6B:
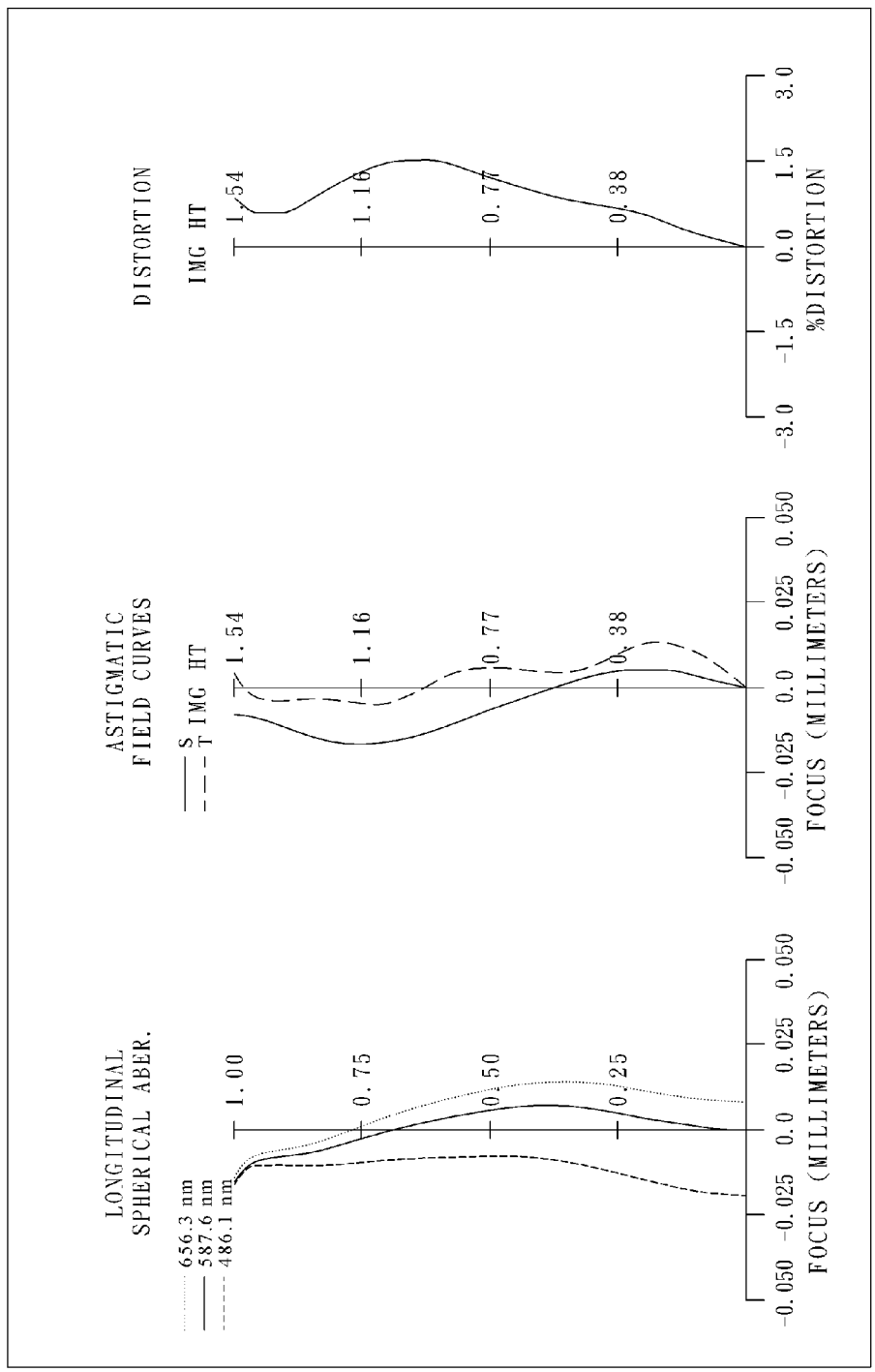
FIG. 6B shows spherical aberration curves, astigmatic field curves and a distortion curve of the imaging lens system according to the 6th embodiment.

FIG. 6A is a schematic view of an imaging lens system according to the 6th embodiment of the present disclosure. FIG. 6B shows spherical aberration curves, astigmatic field curves and a distortion curve of the imaging lens system according to the 6th embodiment. In FIG. 6A, the imaging lens system includes, in order from an object side to an image side, an aperture stop 600, a first lens element 610, a second lens element 620, a third lens element 630, a fourth lens element 640, a fifth lens element 650, an IR-cut filter 660, and an image plane 670.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with positive refractive power has a convex object-side surface 621 at a paraxial region, and a concave image-side surface 622 at a paraxial region, wherein the object-side surface 621 of the second lens element 620 changes from convex at the paraxial region to concave at a peripheral region and the image-side surface 622 of the second lens element 620 changes from concave at the paraxial region to convex at a peripheral region. The second lens element 620 is made of plastic material and has the object-side surface 621 and the image-side surface 622 being aspheric.

The third lens element 630 with positive refractive power has a concave object-side surface 631 and a convex image-side surface 632. The third lens element 630 is made of plastic material and has the object-side surface 631 and the image-side surface 632 being aspheric.

The fourth lens element 640 with negative refractive power has a concave object-side surface 641 and a convex image-side surface 642. The fourth lens element 640 is made of plastic material and has the object-side surface 641 and the image-side surface 642 being aspheric.

The fifth lens element 650 with negative refractive power has a convex object-side surface 651 at a paraxial region and a concave image-side surface 652 at a paraxial region, wherein the object-side surface 651 of the fifth lens element 650 has at least two critical points and the image-side surface 652 of the fifth lens element 650 changes from concave at the paraxial region to convex at a peripheral region. The fifth lens element 650 is made of plastic material and has the object-side surface 651 and the image-side surface 652 being aspheric.

Among all of an axial distance between any two adjacent lens elements of the imaging lens system (that is T12, T23, T34, T45), and the axial distance between the second lens element 620 and the third lens element 630 which is T23 is the largest axial distance. Furthermore, the IR-cut filter 660 is made of glass material, wherein the IR-cut filter 660 is located between the fifth lens element 650 and the image plane 670, and will not affect the focal length of the imaging lens system.

The detailed optical data of the 6th embodiment are shown in Table 11 and the aspheric surface data are shown in Table 12 below.

TABLE 11

6th Embodiment
f = 1.95 mm, Fno = 1.95, HFOV = 38.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.094 | | | | |
| 2 | Lens 1 | 1.143 | (ASP) | 0.349 | Plastic | 1.544 | 55.9 | 3.19 |
| 3 | | 2.985 | (ASP) | 0.107 | | | | |
| 4 | Lens 2 | 1.302 | (ASP) | 0.180 | Plastic | 1.640 | 23.3 | 79.10 |
| 5 | | 1.264 | (ASP) | 0.172 | | | | |
| 6 | Lens 3 | −2.341 | (ASP) | 0.458 | Plastic | 1.544 | 55.9 | 1.19 |
| 7 | | −0.541 | (ASP) | 0.070 | | | | |
| 8 | Lens 4 | −0.428 | (ASP) | 0.190 | Plastic | 1.640 | 23.3 | −11.84 |
| 9 | | −0.532 | (ASP) | 0.035 | | | | |
| 10 | Lens 5 | 1.422 | (ASP) | 0.324 | Plastic | 1.544 | 55.9 | −1.96 |
| 11 | | 0.560 | (ASP) | 0.400 | | | | |
| 12 | IR-cut filter | Plano | | 0.100 | Glass | 1.517 | 64.2 | — |
| 13 | | Plano | | 0.316 | | | | |
| 14 | Image | Plano | | — | | | | |

Reference wavelength (d-line) is 587.6 nm.

TABLE 12

Aspheric Coefficients

| | \multicolumn{5}{c}{Surface #} | | | | |
|---|---|---|---|---|---|
| | 2 | 3 | 4 | 5 | 6 |
| k = | −1.5289E−01 | 1.6921E+00 | 1.4007E−01 | −8.0069E−01 | 6.1053E−01 |
| A4 = | −7.1592E−02 | −7.9344E−01 | −1.1926E+00 | −4.2658E−01 | −1.3401E−01 |
| A6 = | 3.5538E−01 | −1.2455E−01 | −1.8040E+00 | −2.3912E+00 | −4.7036E−01 |
| A8 = | −4.8821E+00 | −8.6323E−01 | −4.6316E+00 | 2.6669E+00 | 4.9181E+00 |
| A10 = | 1.8802E+01 | −9.5748E−01 | 2.6554E+01 | 1.3844E+01 | −9.1908E+00 |
| A12 = | −3.9386E+01 | −2.0423E+00 | −3.2784E+01 | −4.6017E+01 | −2.6452E−01 |
| A14 = | −1.4193E+00 | −1.0239E+01 | −1.7379E+01 | 3.1370E+01 | 3.8260E+01 |
| A16 = | | | | | −5.5416E+01 |

| | \multicolumn{5}{c}{Surface #} | | | | |
|---|---|---|---|---|---|
| | 7 | 8 | 9 | 10 | 11 |
| k = | −1.4588E+00 | −2.6174E+00 | −3.7665E+00 | −2.7525E−01 | −5.5970E+00 |
| A4 = | 3.2918E−01 | 6.8710E−01 | 3.4752E−02 | −1.5286E+00 | −5.6680E−01 |
| A6 = | −7.0597E−01 | −3.6764E−01 | 1.7886E+00 | 3.8842E+00 | 1.1672E+00 |
| A8 = | 2.4089E+00 | 3.1004E+00 | −5.1394E+00 | −7.9850E+00 | −1.9252E+00 |
| A10 = | −6.2803E+00 | −1.9212E+01 | 8.7862E+00 | 1.0985E+01 | 2.0310E+00 |
| A12 = | 5.7473E+00 | 3.9602E+01 | −8.6126E+00 | −8.9136E+00 | −1.3255E+00 |
| A14 = | 9.5216E+00 | −3.4609E+01 | 3.5353E+00 | 3.8619E+00 | 4.8611E−01 |
| A16 = | | 6.9904E+00 | −2.0920E−01 | −6.9368E−01 | −7.5555E−02 |

In the imaging lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| f [mm] | 1.95 | f3/f2 | 0.015 |
|---|---|---|---|
| Fno | 1.95 | Dr6r9/CT3 | 0.644 |
| HFOV [deg.] | 38.1 | (V2 + V4)/V1 | 0.834 |
| f/f4 | −0.165 | f/f3 | 1.645 |
| f/R3 | 1.498 | |f/f1| + |f/f2| | 0.636 |
| |f5/f4| | 0.166 | | |

7th Embodiment

Figure 7A:
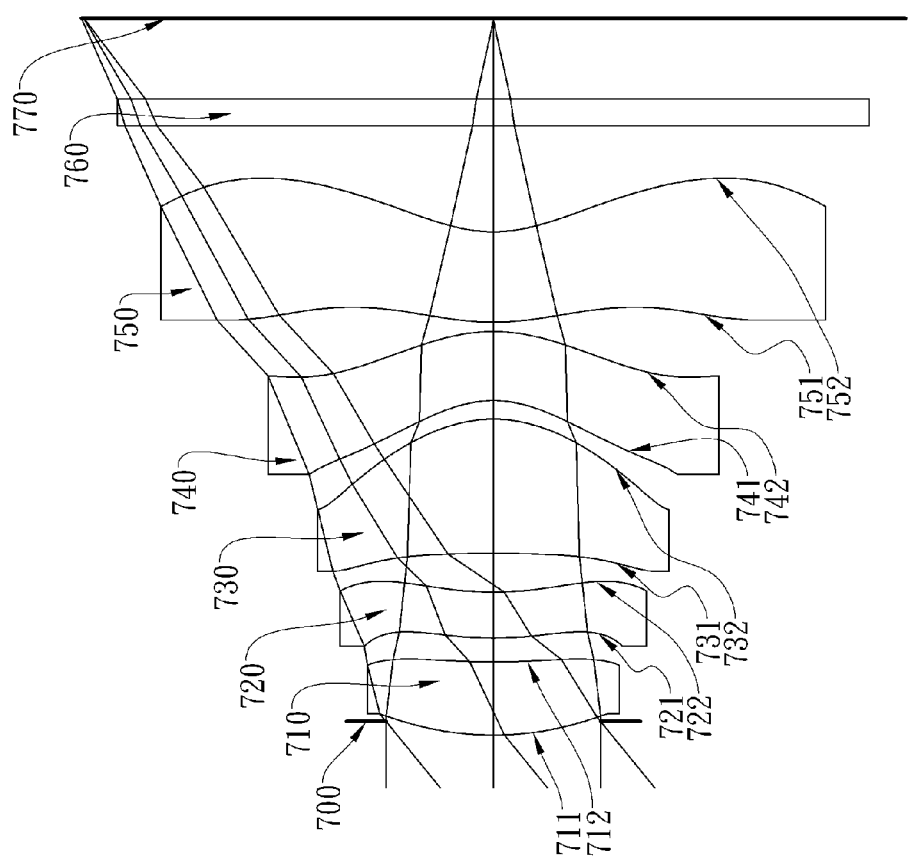
FIG. 7A is a schematic view of an imaging lens system according to the 7th embodiment of the present disclosure.
Figure 7B:
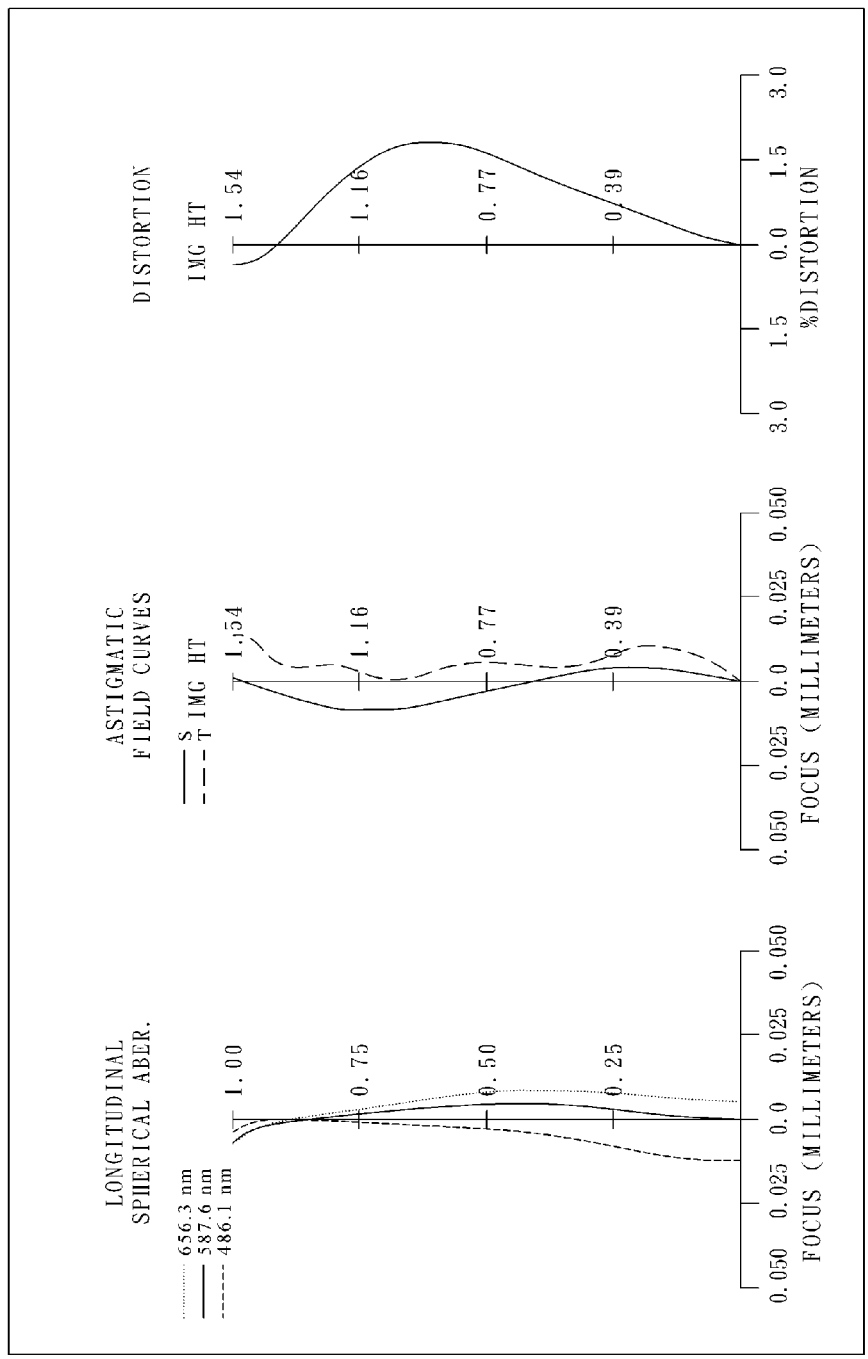
FIG. 7B shows spherical aberration curves, astigmatic field curves and a distortion curve of the imaging lens system according to the 7th embodiment.

FIG. 7A is a schematic view of an imaging lens system according to the 7th embodiment of the present disclosure. FIG. 7B shows spherical aberration curves, astigmatic field curves and a distortion curve of the imaging lens system according to the 7th embodiment. In FIG. 7A, the imaging lens system includes, in order from an object side to an image side, an aperture stop 700, a first lens element 710, a second lens element 720, a third lens element 730, a fourth lens element 740, a fifth lens element 750, an IR-cut filter 760, and an image plane 770.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with positive refractive power has a convex object-side surface 721 at a paraxial region, and a concave image-side surface 722 at a paraxial region, wherein the object-side surface 721 of the second lens element 720 changes from convex at the paraxial region to concave at a peripheral region and the image-side surface 722 of the second lens element 720 changes from concave at the paraxial region to convex at a peripheral region. The second lens element 720 is made of plastic material and has the object-side surface 721 and the image-side surface 722 being aspheric.

The third lens element 730 with positive refractive power has a concave object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742, wherein the image-side surface 742 of the fourth lens element 740 is inclined toward the image side of the imaging lens system at an end of a peripheral region of the image-side surface 742 of the fourth lens element 740 which within a location of a maximum effective radius thereof. The fourth lens element 740 is made of plastic material and has the object-side surface 741 and the image-side surface 742 being aspheric.

The fifth lens element 750 with negative refractive power has a convex object-side surface 751 at a paraxial region and a concave image-side surface 752 at a paraxial region, wherein the image-side surface 752 of the fifth lens element 750 changes from concave at the paraxial region to convex at a peripheral region. The fifth lens element 750 is made of plastic material and has the object-side surface 751 and the image-side surface 752 being aspheric.

Among all of an axial distance between any two adjacent lens elements of the imaging lens system (that is T12, T23, T34, T45), and the axial distance between the second lens element 720 and the third lens element 730 which is T23 is the largest axial distance. Furthermore, the IR-cut filter 760 is made of glass material, wherein the IR-cut filter 760 is located between the fifth lens element 750 and the image plane 770, and will not affect the focal length of the imaging lens system.

The detailed optical data of the 7th embodiment are shown in Table 13 and the aspheric surface data are shown in Table 14 below.

TABLE 13

7th Embodiment
f = 1.90 mm, Fno = 2.35, HFOV = 39.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.051 | | | | |
| 2 | Lens 1 | 1.136 | (ASP) | 0.275 | Plastic | 1.535 | 55.7 | 3.81 |
| 3 | | 2.353 | (ASP) | 0.090 | | | | |
| 4 | Lens 2 | 1.192 | (ASP) | 0.173 | Plastic | 1.634 | 23.8 | 81.70 |
| 5 | | 1.151 | (ASP) | 0.146 | | | | |
| 6 | Lens 3 | −6.452 | (ASP) | 0.506 | Plastic | 1.535 | 55.7 | 1.02 |
| 7 | | −0.519 | (ASP) | 0.070 | | | | |
| 8 | Lens 4 | −0.407 | (ASP) | 0.260 | Plastic | 1.634 | 23.8 | −3.30 |
| 9 | | −0.630 | (ASP) | 0.035 | | | | |
| 10 | Lens 5 | 0.945 | (ASP) | 0.340 | Plastic | 1.535 | 55.7 | −2.90 |
| 11 | | 0.514 | (ASP) | 0.400 | | | | |
| 12 | IR-cut filter | Plano | | 0.100 | Glass | 1.517 | 64.2 | — |
| 13 | | Plano | | 0.305 | | | | |
| 14 | Image | Plano | | — | | | | |

Reference wavelength (d-line) is 587.6 nm.

TABLE 14

Aspheric Coefficients

| | Surface # | | | | |
|---|---|---|---|---|---|
| | 2 | 3 | 4 | 5 | 6 |
| k = | −7.2538E−02 | −2.9115E+01 | −4.0355E+00 | −2.7340E+00 | −2.1780E+01 |
| A4 = | −7.0430E−02 | −8.2254E−01 | −1.4653E+00 | −7.1558E−01 | −2.6246E−01 |
| A6 = | 6.2522E−01 | 7.0715E−01 | −1.5953E+00 | −2.5158E+00 | −1.5957E+00 |
| A8 = | −5.6964E+00 | −4.1985E+00 | −2.5232E+00 | 5.2723E+00 | 4.2907E+00 |
| A10 = | 1.6530E+01 | −9.8326E+00 | 1.0730E+01 | 7.7263E+00 | −7.5131E+00 |
| A12 = | −3.9358E+01 | −5.9881E+00 | −8.8228E+01 | −6.3109E+01 | 1.1683E+01 |
| A14 = | −3.3652E+00 | −1.0997E+01 | −1.7784E+01 | 3.3553E+01 | 5.6101E+01 |
| A16 = | | | | 1.2556E+02 | −9.7455E+01 |

| | Surface # | | | | |
|---|---|---|---|---|---|
| | 7 | 8 | 9 | 10 | 11 |
| k = | −1.3310E+00 | −2.6656E+00 | −4.3313E+00 | −3.4998E+00 | −4.0896E+00 |
| A4 = | 2.4214E−01 | 3.7238E−01 | −5.5351E−02 | −1.5893E+00 | −6.3671E−01 |
| A6 = | −9.4477E−01 | 1.4517E−01 | 1.8656E+00 | 4.0076E+00 | 1.2313E+00 |
| A8 = | 2.0795E+00 | 3.2541E+00 | −5.0195E+00 | −7.9985E+00 | −1.9497E+00 |
| A10 = | −5.9593E+00 | −1.9746E+01 | 8.7785E+00 | 1.0974E+01 | 2.0349E+00 |
| A12 = | 5.8606E+00 | 3.9544E+01 | −8.7128E+00 | −8.9124E+00 | −1.3194E+00 |
| A14 = | 1.1484E+01 | −3.4195E+01 | 3.4420E+00 | 3.8645E+00 | 4.7646E−01 |
| A16 = | 8.0803E+00 | 4.5428E+00 | −3.6948E−02 | −6.9725E−01 | −7.2472E−02 |

In the imaging lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f [mm] | 1.95 | f3/f2 | 0.013 |
|---|---|---|---|
| Fno | 2.35 | Dr6r9/CT3 | 0.721 |
| HFOV [deg.] | 39.2 | (V2 + V4)/V1 | 0.855 |
| f/f4 | −0.574 | f/f3 | 1.850 |
| f/R3 | 1.591 | |f/f1| + |f/f2| | 0.521 |
| |f5/f4| | 0.877 | | |

8th Embodiment

Figure 8A:
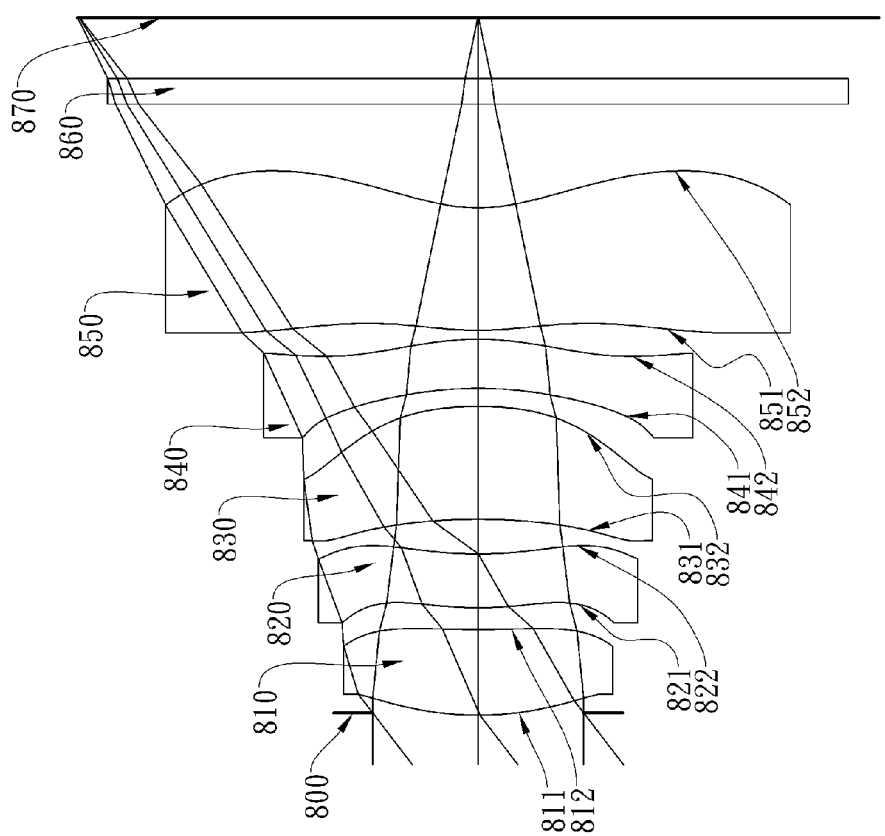
FIG. 8A is a schematic view of an imaging lens system according to the 8th embodiment of the present disclosure.
Figure 8B:
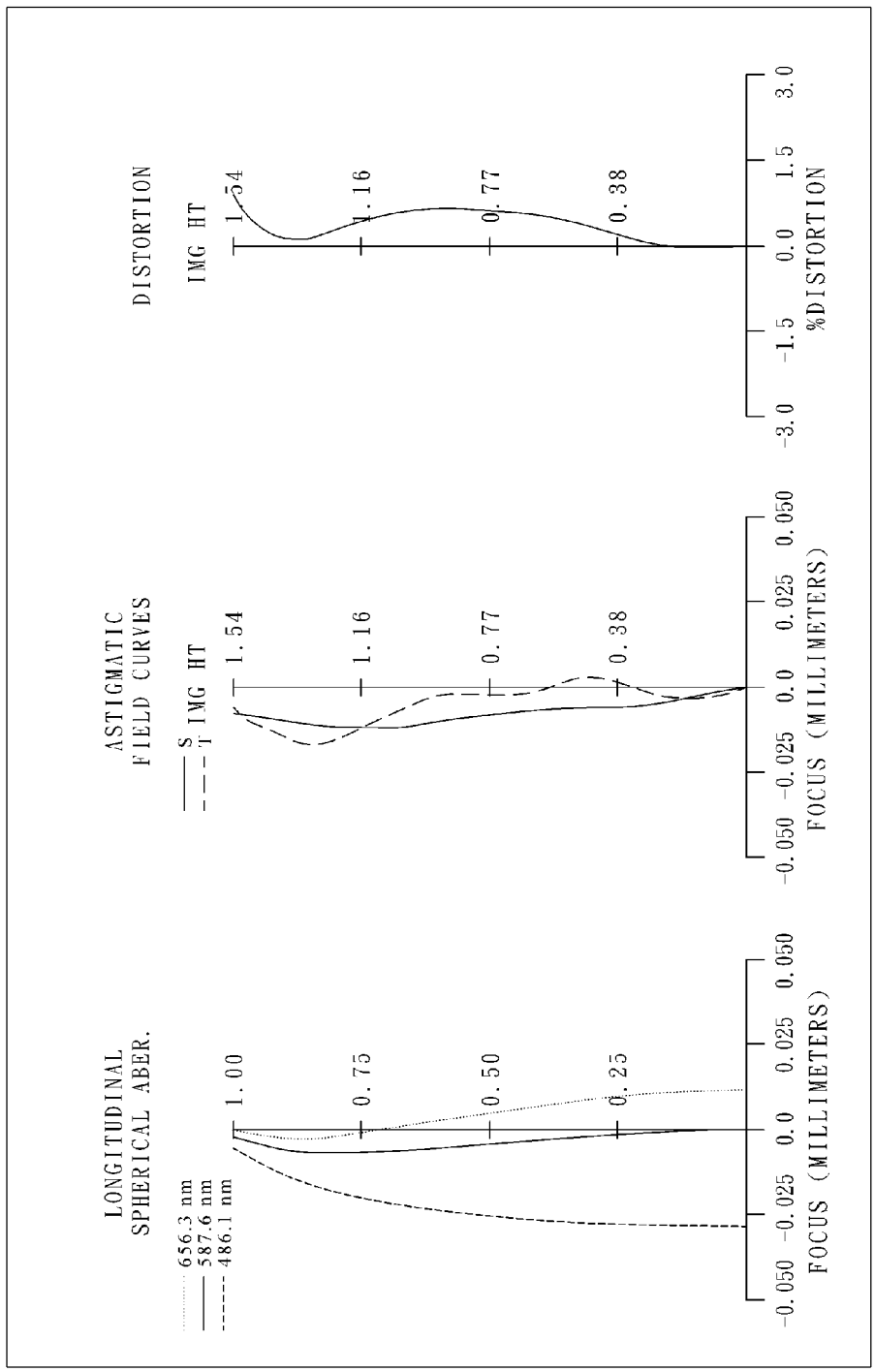
FIG. 8B shows spherical aberration curves, astigmatic field curves and a distortion curve of the imaging lens system according to the 8th embodiment.

FIG. 8A is a schematic view of an imaging lens system according to the 8th embodiment of the present disclosure. FIG. 8B shows spherical aberration curves, astigmatic field curves and a distortion curve of the imaging lens system according to the 8th embodiment. In FIG. 8A, the imaging lens system includes, in order from an object side to an image side, an aperture stop 800, a first lens element 810, a second lens element 820, a third lens element 830, a fourth lens element 840, a fifth lens element 850, an IR-cut filter 860, and an image plane 870.

The first lens element 810 with positive refractive power has a convex object-side surface 811 and a concave image-side surface 812. The first lens element 810 is made of plastic material and has the object-side surface 811 and the image-side surface 812 being aspheric.

The second lens element 820 with positive refractive power has a convex object-side surface 821 at a paraxial region, and a concave image-side surface 822 at a paraxial region, wherein the object-side surface 821 of the second lens element 820 changes from convex at the paraxial region to concave at a peripheral region and the image-side surface 822 of the second lens element 820 changes from concave at the paraxial region to convex at a peripheral region. The second lens element 820 is made of plastic material and has the object-side surface 821 and the image-side surface 822 being aspheric.

The third lens element 830 with positive refractive power has a concave object-side surface 831 and a convex image-side surface 832. The third lens element 830 is made of plastic material and has the object-side surface 831 and the image-side surface 832 being aspheric.

The fourth lens element 840 with positive refractive power has a concave object-side surface 841 and a convex image-side surface 842, wherein the image-side surface 842 of the fourth lens element 840 is inclined toward the image side of the imaging lens system at an end of a peripheral region of the image-side surface 842 of the fourth lens element 840 which within a location of a maximum effective radius thereof. The fourth lens element 840 is made of plastic material and has the object-side surface 841 and the image-side surface 842 being aspheric.

The fifth lens element 850 with negative refractive power has a convex object-side surface 851 at a paraxial region and a concave image-side surface 852 at a paraxial region, wherein the object-side surface 851 of the fifth lens element 850 has at least two critical points and the image-side surface 852 of the fifth lens element 850 changes from concave at the paraxial region to convex at a peripheral region. The fifth lens element 850 is made of plastic material and has the object-side surface 851 and the image-side surface 852 being aspheric.

Among all of an axial distance between any two adjacent lens elements of the imaging lens system (that is T12, T23, T34, T45), and the axial distance between the second lens element 820 and the third lens element 830 which is T23 is the largest axial distance. Furthermore, the IR-cut filter 860 is made of glass material, wherein the IR-cut filter 860 is located between the fifth lens element 850 and the image plane 870, and will not affect the focal length of the imaging lens system.

The detailed optical data of the 8th embodiment are shown in Table 15 and the aspheric surface data are shown in Table 16 below.

TABLE 15

8th Embodiment
f = 2.00 mm, Fno = 2.45, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.009 | | | | |
| 2 | Lens 1 | 1.195 | (ASP) | 0.331 | Plastic | 1.535 | 56.3 | 3.37 |
| 3 | | 3.210 | (ASP) | 0.085 | | | | |
| 4 | Lens 2 | 1.318 | (ASP) | 0.208 | Plastic | 1.633 | 23.4 | 13.59 |
| 5 | | 1.462 | (ASP) | 0.134 | | | | |
| 6 | Lens 3 | −2.464 | (ASP) | 0.437 | Plastic | 1.535 | 56.3 | 4.96 |
| 7 | | −1.356 | (ASP) | 0.070 | | | | |
| 8 | Lens 4 | −1.432 | (ASP) | 0.190 | Plastic | 1.633 | 23.4 | 7.10 |
| 9 | | −1.142 | (ASP) | 0.035 | | | | |
| 10 | Lens 5 | 1.305 | (ASP) | 0.474 | Plastic | 1.583 | 30.2 | −3.25 |
| 11 | | 0.669 | (ASP) | 0.400 | | | | |
| 12 | IR-cut filter | Plano | | 0.100 | Glass | 1.517 | 64.2 | — |
| 13 | | Plano | | 0.236 | | | | |
| 14 | Image | Plano | | — | | | | |

Reference wavelength (d-line) is 587.6 nm.

TABLE 16

Aspheric Coefficients

| | Surface # | | | | |
|---|---|---|---|---|---|
| | 2 | 3 | 4 | 5 | 6 |
| k = | −3.1771E−01 | −5.0388E+01 | −5.5945E+00 | 1.1154E−02 | −3.5226E+00 |
| A4 = | −8.3580E−02 | −1.1549E+00 | −1.3222E+00 | −4.8758E−01 | −9.7809E−02 |
| A6 = | −2.8335E−01 | 5.0953E−01 | −2.1261E+00 | −3.7912E+00 | −8.2686E−01 |
| A8 = | −7.5472E−01 | −7.9828E+00 | −8.8093E+00 | 6.3651E+00 | 2.7721E+00 |
| A10 = | 1.5454E−01 | 2.1280E+01 | 4.1476E+01 | 1.0467E+01 | −9.2456E+00 |
| A12 = | −2.8493E+01 | 1.8624E+00 | −3.5077E+01 | −6.6047E+01 | 1.0783E+01 |
| A14 = | −1.4193E+00 | −1.1655E+02 | −2.4907E+01 | 9.2779E+01 | 6.7946E+01 |
| A16 = | | | | | −1.0506E+02 |

TABLE 16-continued

Aspheric Coefficients

Surface #

| | 7 | 8 | 9 | 10 | 11 |
|---|---|---|---|---|---|
| k = | 8.8884E−01 | −3.0808E+01 | −6.3221E+00 | −7.1295E+00 | −4.8749E+00 |
| A4 = | −1.3789E+00 | −4.7852E−01 | 3.2248E−01 | −1.6170E+00 | −6.9456E−01 |
| A6 = | 1.3752E+00 | −1.3696E−01 | 1.4318E+00 | 4.4003E+00 | 1.3147E+00 |
| A8 = | 3.6148E+00 | 5.7212E+00 | −5.4056E+00 | −8.0201E+00 | −1.9642E+00 |
| A10 = | −7.6936E+00 | −2.1342E+01 | 8.9011E+00 | 1.0500E+01 | 1.9847E+00 |
| A12 = | 2.3264E+00 | 3.4446E+01 | −8.3328E+00 | −8.8558E+00 | −1.3001E+00 |
| A14 = | 1.0538E+01 | −3.1398E+01 | 3.7616E+00 | 4.2084E+00 | 4.9119E−01 |
| A16 = | | 1.7055E+00 | −3.8981E−01 | −8.9392E−01 | −8.0482E−02 |

In the imaging lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| f [mm] | 2.00 | f3/f2 | 0.365 |
|---|---|---|---|
| Fno | 2.45 | Dr6r9/CT3 | 0.675 |
| HFOV [deg.] | 37.5 | (V2 + V4)/V1 | 0.831 |
| f/f4 | 0.282 | f/f3 | 0.403 |
| f/R3 | 1.516 | |f/f1| + |f/f2| | 0.740 |
| |f5/f4| | 0.458 | | |

9th Embodiment

Figure 9A:
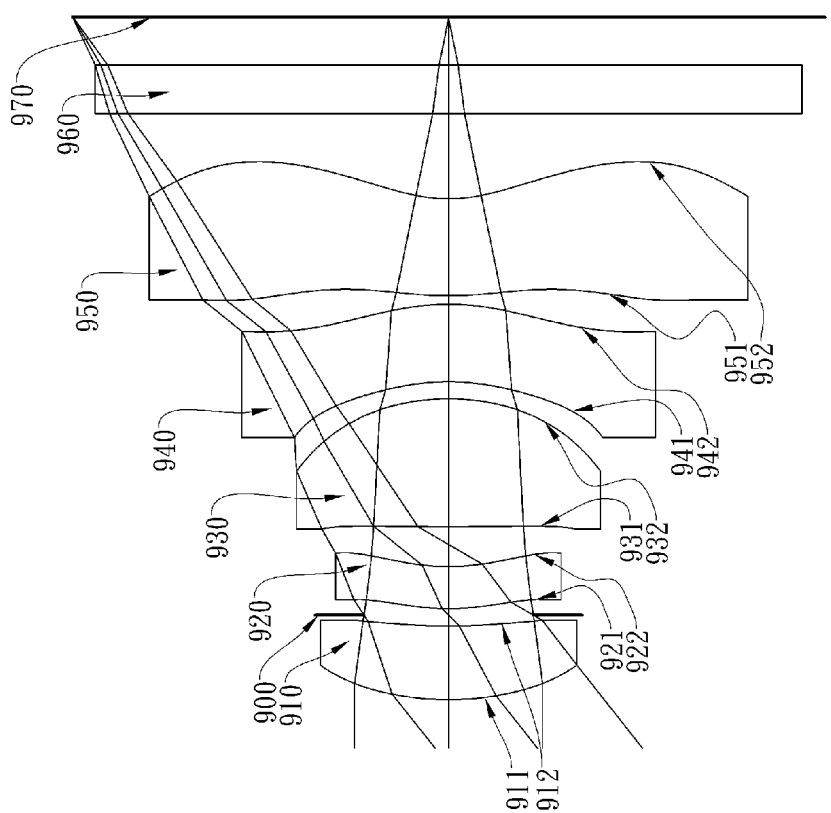
FIG. 9A is a schematic view of an imaging lens system according to the 9th embodiment of the present disclosure.
Figure 9B:
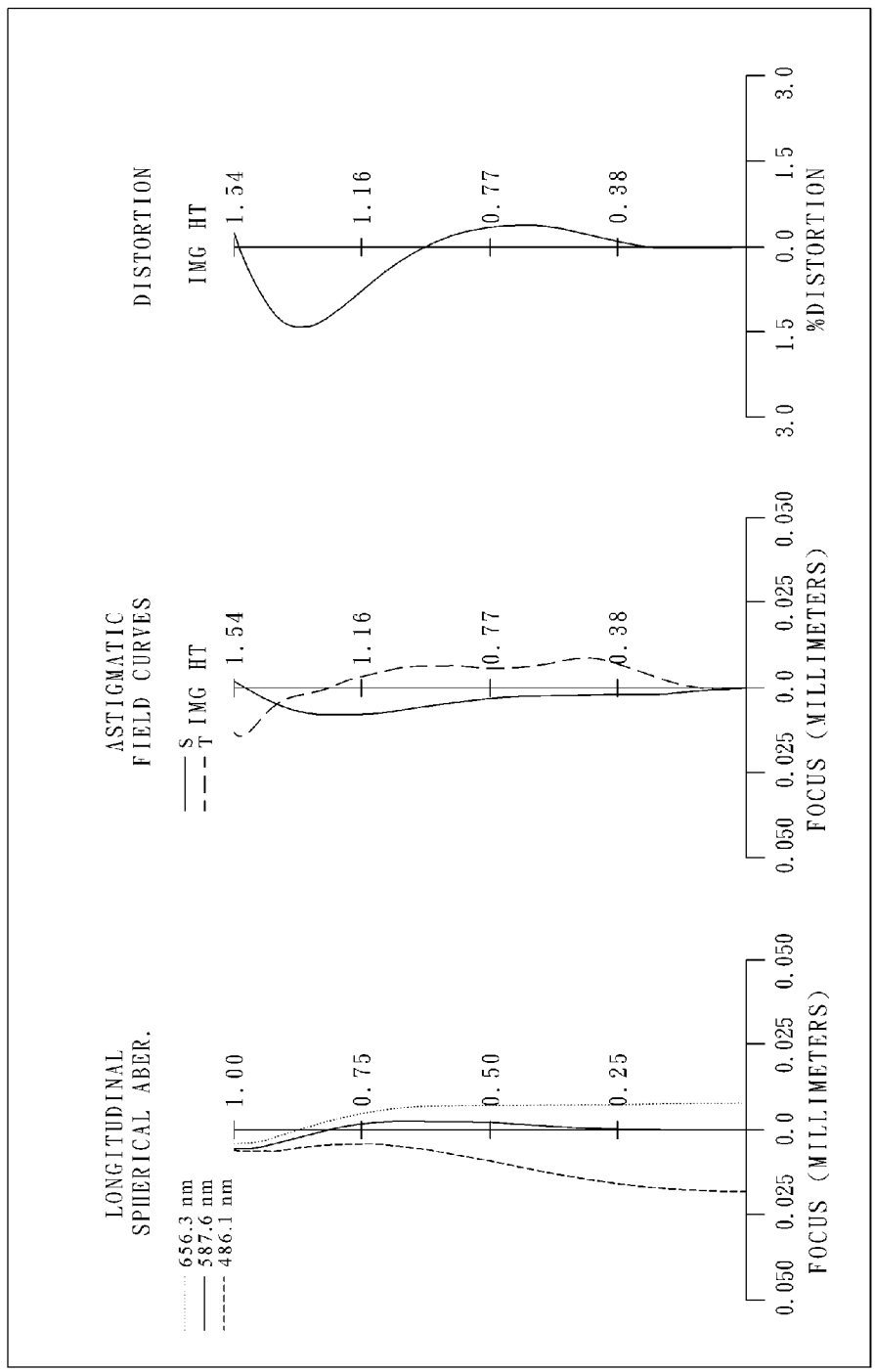
FIG. 9B shows spherical aberration curves, astigmatic field curves and a distortion curve of the imaging lens system according to the 9th embodiment.

FIG. 9A is a schematic view of an imaging lens system according to the 9th embodiment of the present disclosure. FIG. 9B shows spherical aberration curves, astigmatic field curves and a distortion curve of the imaging lens system according to the 9th embodiment. In FIG. 9A, the imaging lens system includes, in order from an object side to an image side, a first lens element 910, an aperture stop 900, a second lens element 920, a third lens element 930, a fourth lens element 940, a fifth lens element 950, an IR-cut filter 960, and an image plane 970.

The first lens element 910 with positive refractive power has a convex object-side surface 911 and a concave image-side surface 912. The first lens element 910 is made of glass material and has the object-side surface 911 and the image-side surface 912 being aspheric.

The second lens element 920 with positive refractive power has a convex object-side surface 921 at a paraxial region, and a concave image-side surface 922 at a paraxial region, wherein the object-side surface 921 of the second lens element 920 changes from convex at the paraxial region to concave at a peripheral region and the image-side surface 922 of the second lens element 920 changes from concave at the paraxial region to convex at a peripheral region. The second lens element 920 is made of plastic material and has the object-side surface 921 and the image-side surface 922 being aspheric.

The third lens element 930 with positive refractive power has a convex object-side surface 931 and a convex image-side surface 932. The third lens element 930 is made of plastic material and has the object-side surface 931 and the image-side surface 932 being aspheric.

The fourth lens element 940 with positive refractive power has a concave object-side surface 941 and a convex image-side surface 942, wherein the image-side surface 942 of the fourth lens element 940 is inclined toward the image side of the imaging lens system at an end of a peripheral region of the image-side surface 942 of the fourth lens element 940 which within a location of a maximum effective radius thereof. The fourth lens element 940 is made of plastic material and has the object-side surface 941 and the image-side surface 942 being aspheric.

The fifth lens element 950 with negative refractive power has a convex object-side surface 951 at a paraxial region and a concave image-side surface 952 at a paraxial region, wherein the object-side surface 951 of the fifth lens element 950 has at least two critical points and the image-side surface 952 of the fifth lens element 950 changes from concave at the paraxial region to convex at a peripheral region. The fifth lens element 950 is made of plastic material and has the object-side surface 951 and the image-side surface 952 being aspheric.

Among all of an axial distance between any two adjacent lens elements of the imaging lens system (that is T12, T23, T34, T45), and the axial distance between the second lens element 920 and the third lens element 930 which is T23 is the largest axial distance. Furthermore, the IR-cut filter 960 is made of glass material, wherein the IR-cut filter 960 is located between the fifth lens element 950 and the image plane 970, and will not affect the focal length of the imaging lens system.

The detailed optical data of the 9th embodiment are shown in Table 17 and the aspheric surface data are shown in Table 18 below.

TABLE 17

9th Embodiment
f = 1.94 mm, Fno = 2.52, HFOV = 38.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.230 | (ASP) | 0.302 | Glass | 1.542 | 62.9 | 4.94 |
| 2 | | 2.076 | (ASP) | 0.045 | | | | |

TABLE 17-continued

9th Embodiment
f = 1.94 mm, Fno = 2.52, HFOV = 38.4 deg.

| Surface # | | Curvature Radius | | Thickness | Material | Index | Abbe # | Focal length |
|---|---|---|---|---|---|---|---|---|
| 3 | Ape. Stop | Plano | | 0.026 | | | | |
| 4 | Lens 2 | 0.897 | (ASP) | 0.173 | Plastic | 1.634 | 23.8 | 41.56 |
| 5 | | 0.860 | (ASP) | 0.163 | | | | |
| 6 | Lens 3 | 11.662 | (ASP) | 0.526 | Plastic | 1.544 | 55.9 | 1.65 |
| 7 | | −0.960 | (ASP) | 0.070 | | | | |
| 8 | Lens 4 | −0.939 | (ASP) | 0.318 | Plastic | 1.634 | 23.8 | 20.28 |
| 9 | | −0.990 | (ASP) | 0.035 | | | | |
| 10 | Lens 5 | 1.327 | (ASP) | 0.398 | Plastic | 1.583 | 30.2 | −2.31 |
| 11 | | 0.595 | (ASP) | 0.350 | | | | |
| 12 | IR-cut filter | Plano | | 0.200 | Glass | 1.517 | 64.2 | — |
| 13 | | Plano | | 0.196 | | | | |
| 14 | Image | Plano | | — | | | | |

Reference wavelength (d-line) is 587.6 nm.

TABLE 18

Aspheric Coefficients

| | Surface # | | | | |
|---|---|---|---|---|---|
| | 1 | 2 | 4 | 5 | 6 |
| k = | 1.0678E+00 | −7.4304E+01 | −9.4874E+00 | −5.8830E+00 | 4.5701E+01 |
| A4 = | 6.2604E−04 | −4.2117E−01 | −1.0225E+00 | −5.1463E−01 | −1.6576E−01 |
| A6 = | 9.4298E−01 | 4.0818E+00 | −6.7967E−01 | −2.4729E+00 | 4.5943E−02 |
| A8 = | −2.0235E+00 | −1.2289E+01 | −2.4085E+00 | 6.7500E+00 | 6.2559E−01 |
| A10 = | 2.9709E+00 | 1.7887E+01 | 1.7222E+01 | −5.5860E+00 | −1.2737E+01 |
| A12 = | 2.0347E+01 | −2.8924E+01 | −7.4353E+01 | −8.1947E+00 | 1.0958E+01 |
| A14 = | −4.9175E+01 | −1.1655E+02 | −8.4479E+02 | 5.2750E+01 | 6.7437E+01 |
| A16 = | | | | | −1.9271E+02 |

| | Surface # | | | | |
|---|---|---|---|---|---|
| | 7 | 8 | 9 | 10 | 11 |
| k = | −4.1176E−01 | −6.1304E+00 | −2.8829E+00 | −1.53582E+00 | −4.6881E+00 |
| A4 = | −5.0266E−01 | −2.6646E−02 | 2.9081E−01 | −1.82932E+00 | −7.1901E−01 |
| A6 = | 1.8585E−01 | −9.9251E−01 | 1.4717E+00 | 4.39222E+00 | 1.3393E+00 |
| A8 = | 1.5128E+00 | 4.5818E+00 | −5.3926E+00 | −7.89378E+00 | −1.9902E+00 |
| A10 = | −8.9977E+00 | −2.1954E+01 | 8.9578E+00 | 1.05597E+01 | 1.9983E+00 |
| A12 = | 2.9263E+00 | 3.6835E+01 | −8.2153E+00 | −8.94799E+00 | −1.3039E+00 |
| A14 = | 1.5268E+01 | −2.7561E+01 | 3.7951E+00 | 4.15450E+00 | 4.9107E−01 |
| A16 = | | −1.2810E+01 | −6.1405E−01 | −8.04498E−01 | −7.8937E−02 |

In the imaging lens system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| f [mm] | 1.94 | f3/f2 | 0.040 |
|---|---|---|---|
| Fno | 2.52 | Dr6r9/CT3 | 0.804 |
| HFOV [deg.] | 38.4 | (V2 + V4)/V1 | 0.757 |
| f/f4 | 0.096 | f/f3 | 1.174 |
| f/R3 | 2.660 | |f/f1| + |f/f2| | 0.440 |
| |f5/f4| | 0.114 | | |

10th Embodiment

Figure 10A:
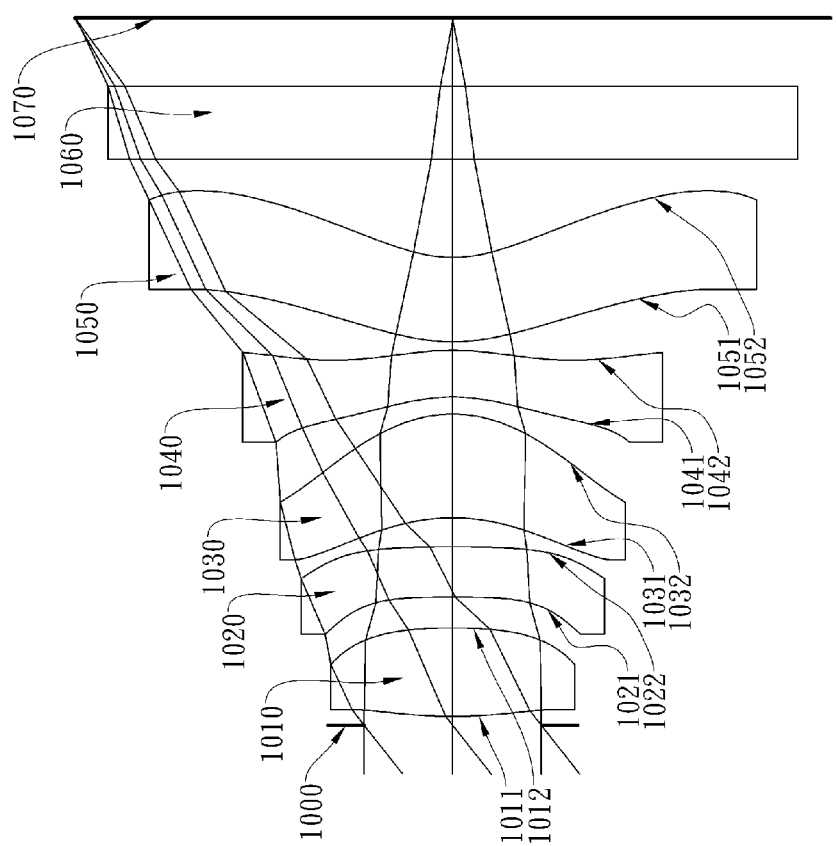
FIG. 10A is a schematic view of an imaging lens system according to the 10th embodiment of the present disclosure.
Figure 10B:
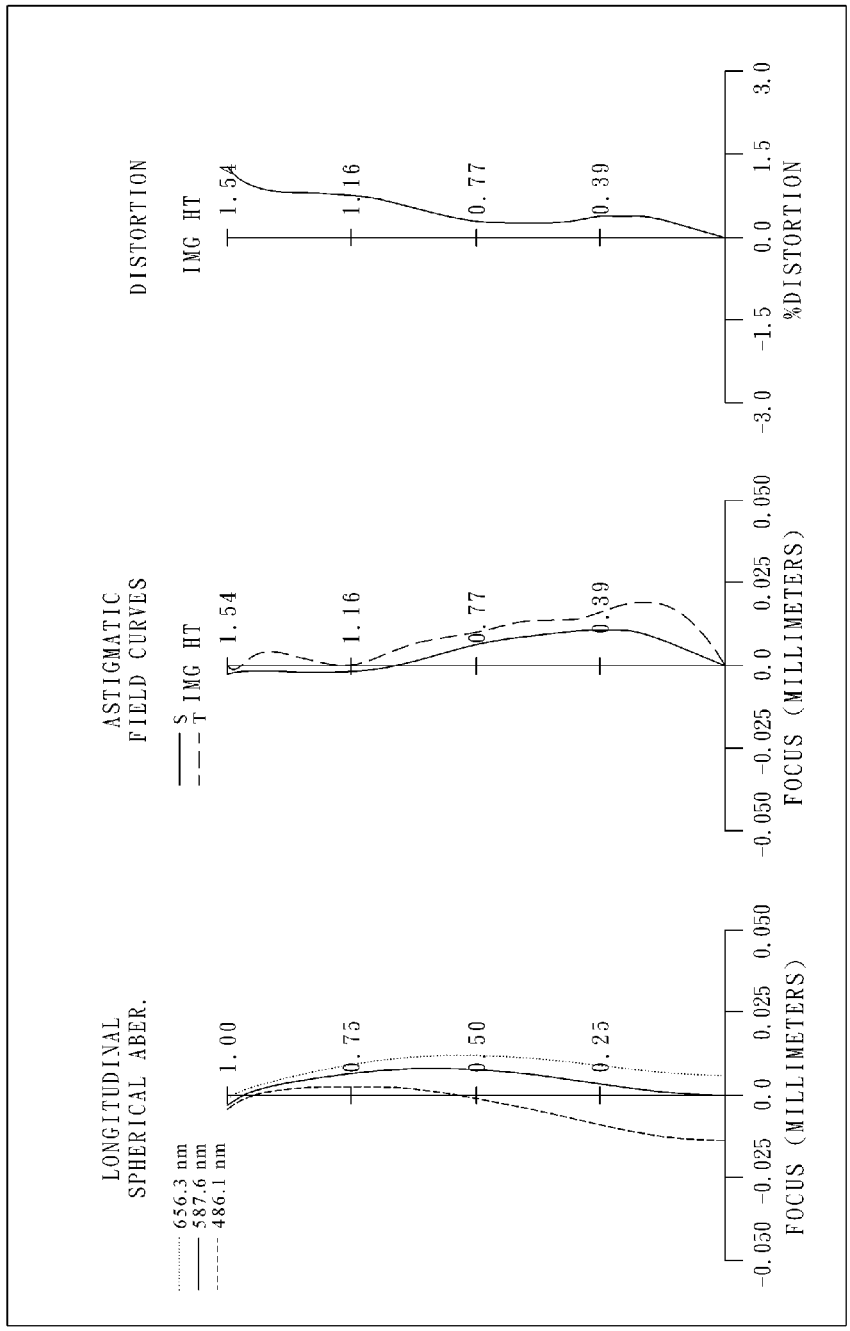
FIG. 10B shows spherical aberration curves, astigmatic field curves and a distortion curve of the imaging lens system according to the 10th embodiment.

FIG. 10A is a schematic view of an imaging lens system according to the 10th embodiment of the present disclosure. FIG. 10B shows spherical aberration curves, astigmatic field curves and a distortion curve of the imaging lens system according to the 10th embodiment. In FIG. 10A, the imaging lens system includes, in order from an object side to an image side, an aperture stop 1000, a first lens element 1010, a second lens element 1020, a third lens element 1030, a fourth lens element 1040, a fifth lens element 1050, an IR-cut filter 1060, and an image plane 1070.

The first lens element 1010 with positive refractive power has a convex object-side surface 1011 and a convex image-side surface 1012. The first lens element 1010 is made of plastic material and has the object-side surface 1011 and the image-side surface 1012 being aspheric.

The second lens element 1020 with positive refractive power has a concave object-side surface 1021 at a paraxial region, and a convex image-side surface 1022 at a paraxial region. The second lens element 1020 is made of plastic material and has the object-side surface 1021 and the image-side surface 1022 being aspheric.

The third lens element 1030 with positive refractive power has a concave object-side surface 1031 and a convex image-side surface 1032. The third lens element 1030 is made of plastic material and has the object-side surface 1031 and the image-side surface 1032 being aspheric.

The fourth lens element 1040 with negative refractive power has a concave object-side surface 1041 and a convex image-side surface 1042, wherein the image-side surface 1042 of the fourth lens element 1040 is inclined toward the image side of the imaging lens system at an end of a peripheral region of the image-side surface 1042 of the fourth lens element 1040 which within a location of a maximum effective radius thereof. The fourth lens element 1040 is made of plastic material and has the object-side surface 1041 and the image-side surface 1042 being aspheric.

The fifth lens element 1050 with negative refractive power has a convex object-side surface 1051 at a paraxial region and a concave image-side surface 1052 at a paraxial region, wherein the image-side surface 1052 of the fifth lens element 1050 changes from concave at the paraxial region to convex at a peripheral region. The fifth lens element 1050 is made of plastic material and has the object-side surface 1051 and the image-side surface 1052 being aspheric.

The IR-cut filter 1060 is made of glass material, wherein the IR-cut filter 1060 is located between the fifth lens element 1050 and the image plane 1070, and will not affect the focal length of the imaging lens system.

The detailed optical data of the 10th embodiment are shown in Table 19 and the aspheric surface data are shown in Table 20 below.

TABLE 19

10th Embodiment
f = 1.93 mm, Fno = 2.68, HFOV = 38.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | 0.036 | | | | |
| 2 | Lens 1 | 1.856 | (ASP) | 0.361 | Plastic | 1.535 | 56.3 | 1.99 |
| 3 | | −2.337 | (ASP) | 0.126 | | | | |
| 4 | Lens 2 | −6.948 | (ASP) | 0.205 | Plastic | 1.633 | 23.4 | 38.69 |
| 5 | | −5.474 | (ASP) | 0.119 | | | | |
| 6 | Lens 3 | −0.775 | (ASP) | 0.423 | Plastic | 1.535 | 56.3 | 2.05 |
| 7 | | −0.541 | (ASP) | 0.070 | | | | |
| 8 | Lens 4 | −0.710 | (ASP) | 0.190 | Plastic | 1.633 | 23.4 | −3.85 |
| 9 | | −1.105 | (ASP) | 0.035 | | | | |
| 10 | Lens 5 | 0.762 | (ASP) | 0.344 | Plastic | 1.583 | 30.2 | −5.62 |
| 11 | | 0.516 | (ASP) | 0.400 | | | | |
| 12 | IR-cut filter | Plano | | 0.300 | Glass | 1.517 | 64.2 | — |
| 13 | | Plano | | 0.277 | | | | |
| 14 | Image | Plano | | — | | | | |

Reference wavelength (d-line) is 587.6 nm.

TABLE 20

Aspheric Coefficients

| | Surface # | | | | |
|---|---|---|---|---|---|
| | 2 | 3 | 4 | 5 | 6 |
| k = | −4.7071E+00 | −6.7391E+01 | −1.0000E+02 | −1.0000E+02 | −3.9717E+00 |
| A4 = | −2.3590E−01 | −1.8118E+00 | −1.2494E+00 | −1.9205E−03 | −1.5051E−01 |
| A6 = | −1.4700E+00 | 1.2919E+00 | −4.7068E+00 | −4.2508E+00 | −5.5093E−03 |
| A8 = | 2.0577E+00 | −6.8025E+00 | 4.2887E−01 | 6.2209E+00 | 4.4059E+00 |
| A10 = | −3.2684E+01 | 3.9583E−01 | 6.1683E+01 | 1.1766E+01 | −1.0189E+01 |
| A12 = | −3.1962E+01 | 6.3339E+01 | −1.9106E+02 | −5.8543E+01 | −1.5928E+00 |
| A14 = | −1.4226E+00 | −2.1633E+02 | 3.2009E+02 | 7.5492E+01 | 4.3301E+01 |
| A16 = | | | | | −4.5664E+01 |

| | Surface # | | | | |
|---|---|---|---|---|---|
| | 7 | 8 | 9 | 10 | 11 |
| k = | −6.7754E−01 | −7.5830E+00 | −1.9785E+01 | −1.00256E+00 | −4.0233E+00 |
| A4 = | 4.6241E−01 | 4.2576E−01 | 4.5458E−01 | −1.55466E+00 | −4.9676E−01 |
| A6 = | −2.5597E−01 | −8.2864E−01 | 9.8828E−01 | 4.04899E+00 | 1.1633E+00 |
| A8 = | 3.4178E+00 | 4.5055E+00 | −5.3229E+00 | −8.15415E+00 | −1.9779E+00 |
| A10 = | −4.6988E+00 | −2.0376E+01 | 9.1790E+00 | 1.07763E+01 | 2.0796E+00 |
| A12 = | 4.6515E+00 | 3.6989E+01 | −8.1517E+00 | −8.76074E+00 | −1.3164E+00 |
| A14 = | −3.9944E+00 | −2.9871E+01 | 3.6383E+00 | 3.97236E+00 | 4.5813E−01 |
| A16 = | | 5.6125E+00 | −5.9108E−01 | −7.70795E−01 | −6.7614E−02 |

In the imaging lens system according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| f [mm] | 1.93 | f3/f2 | 0.053 |
|---|---|---|---|
| Fno | 2.68 | Dr6r9/CT3 | 0.697 |
| HFOV [deg.] | 38.2 | (V2 + V4)/V1 | 0.831 |
| f/f4 | −0.503 | f/f3 | 0.942 |
| f/R3 | −0.278 | |f/f1| + |f/f2| | 1.020 |
| |f5/f4| | 1.461 | | |

11th Embodiment

Figure 11A:
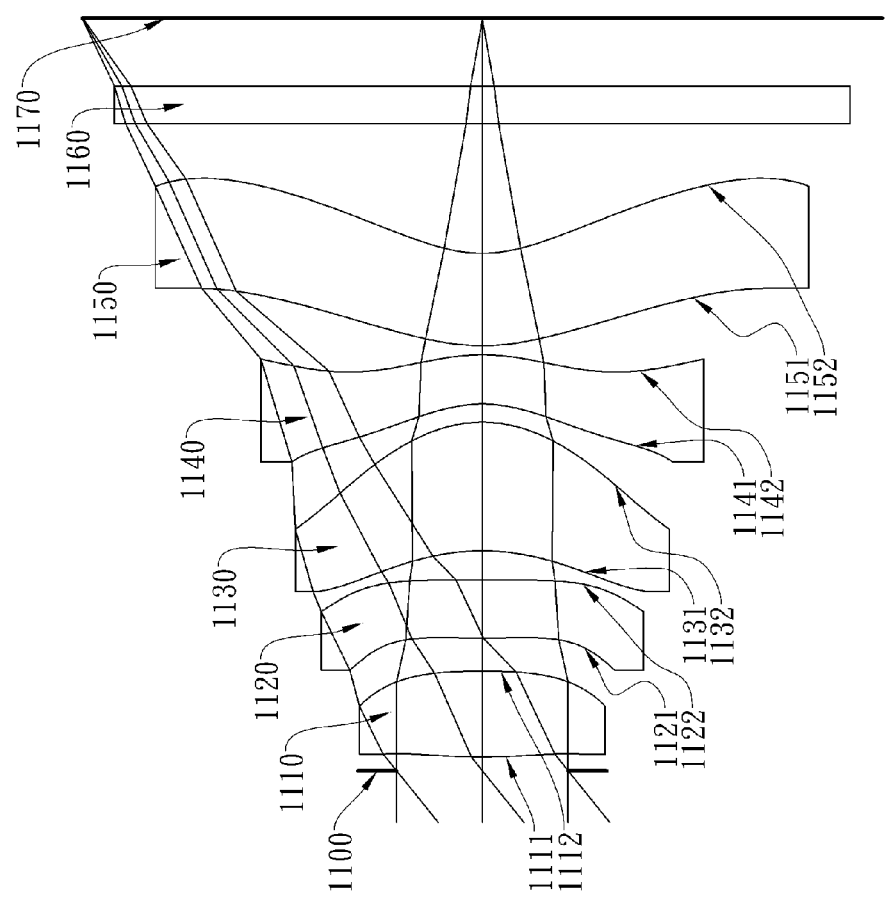
FIG. 11A is a schematic view of an imaging lens system according to the 11th embodiment of the present disclosure.
Figure 11B:
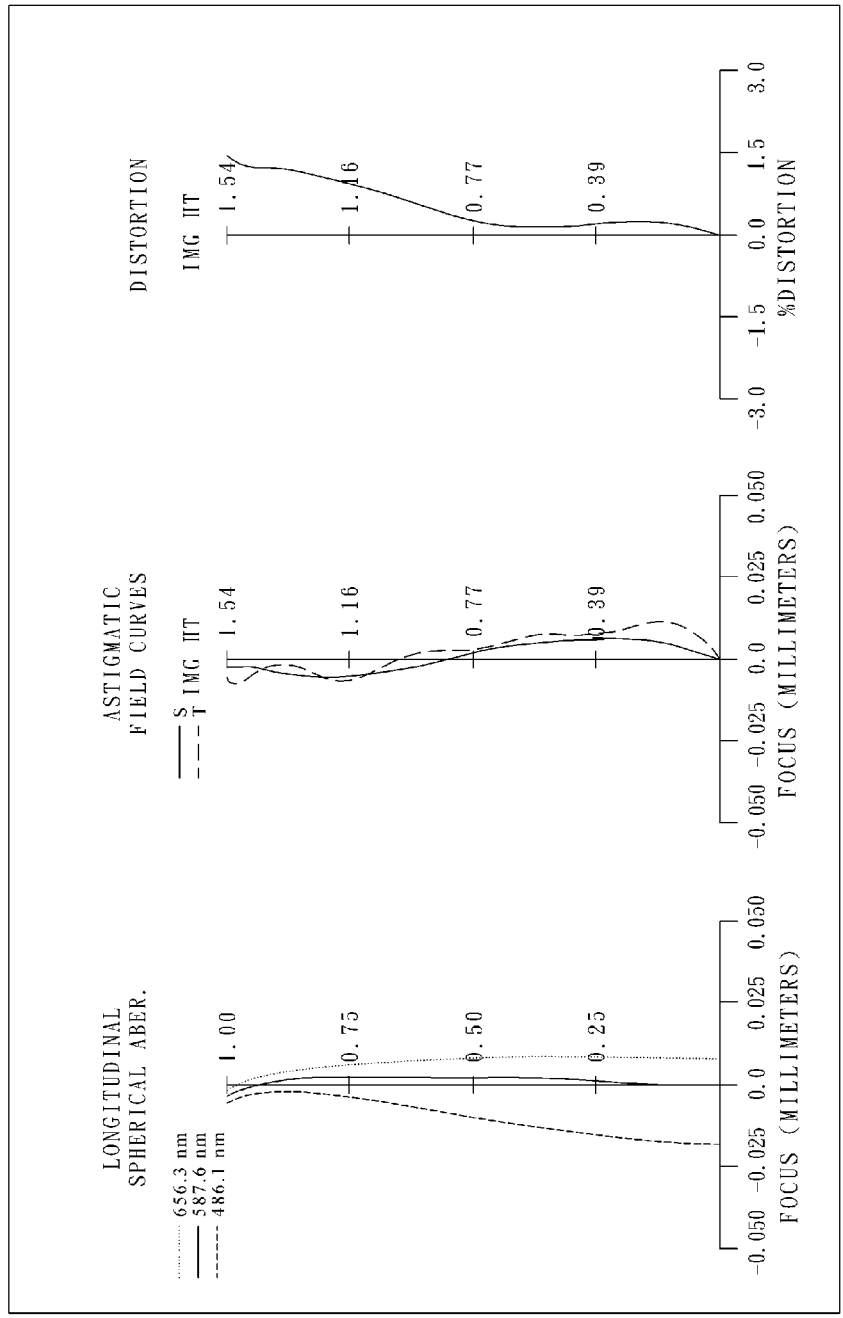
FIG. 11B shows spherical aberration curves, astigmatic field curves and a distortion curve of the imaging lens system according to the 11th embodiment.

FIG. 11A is a schematic view of an imaging lens system according to the 11th embodiment of the present disclosure. FIG. 11B shows spherical aberration curves, astigmatic field curves and a distortion curve of the imaging lens system according to the 11th embodiment. In FIG. 11A, the imaging lens system includes, in order from an object side to an image side, an aperture stop 1100, a first lens element 1110, a second lens element 1120, a third lens element 1130, a fourth lens element 1140, a fifth lens element 1150, an IR-cut filter 1160, and an image plane 1170.

The first lens element 1110 with positive refractive power has a convex object-side surface 1111 and a convex image-side surface 1112. The first lens element 1110 is made of plastic material and has the object-side surface 1111 and the image-side surface 1112 being aspheric.

The second lens element 1120 with positive refractive power has a convex object-side surface 1121 at a paraxial region, and a convex image-side surface 1122 at a paraxial region. The second lens element 1120 is made of plastic material and has the object-side surface 1121 and the image-side surface 1122 being aspheric.

The third lens element 1130 with positive refractive power has a concave object-side surface 1131 and a convex image-side surface 1132. The third lens element 1130 is made of plastic material and has the object-side surface 1131 and the image-side surface 1132 being aspheric.

The fourth lens element 1140 with negative refractive power has a concave object-side surface 1141 and a convex image-side surface 1142, wherein the image-side surface 1142 of the fourth lens element 1140 is inclined toward the image side of the imaging lens system at an end of a peripheral region of the image-side surface 1142 of the fourth lens element 1140 which within a location of a maximum effective radius thereof. The fourth lens element 1140 is made of plastic material and has the object-side surface 1141 and the image-side surface 1142 being aspheric.

The fifth lens element 1150 with negative refractive power has a convex object-side surface 1151 at a paraxial region and a concave image-side surface 1152 at a paraxial region, wherein the image-side surface 1152 of the fifth lens element 1150 changes from concave at the paraxial region to convex at a peripheral region. The fifth lens element 1150 is made of plastic material and has the object-side surface 1151 and the image-side surface 1152 being aspheric.

The IR-cut filter 1160 is made of glass material, wherein the IR-cut filter 1160 is located between the fifth lens element 1150 and the image plane 1170, and will not affect the focal length of the imaging lens system.

The detailed optical data of the 11th embodiment are shown in Table 21 and the aspheric surface data are shown in Table 22 below.

TABLE 21

11th Embodiment
f = 1.90 mm, Fno = 2.87, HFOV = 38.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | 0.053 | | | | |
| 2 | Lens 1 | 2.617 | (ASP) | 0.331 | Plastic | 1.535 | 56.3 | 2.54 |
| 3 | | −2.697 | (ASP) | 0.127 | | | | |
| 4 | Lens 2 | 4.566 | (ASP) | 0.224 | Plastic | 1.633 | 23.4 | 6.87 |
| 5 | | −88.838 | (ASP) | 0.113 | | | | |
| 6 | Lens 3 | −0.845 | (ASP) | 0.496 | Plastic | 1.535 | 56.3 | 1.54 |
| 7 | | −0.502 | (ASP) | 0.070 | | | | |
| 8 | Lens 4 | −0.507 | (ASP) | 0.190 | Plastic | 1.633 | 23.4 | −3.32 |
| 9 | | −0.766 | (ASP) | 0.035 | | | | |
| 10 | Lens 5 | 0.809 | (ASP) | 0.356 | Plastic | 1.583 | 30.2 | −4.02 |
| 11 | | 0.504 | (ASP) | 0.500 | | | | |
| 12 | IR-cut filter | Plano | | 0.145 | Glass | 1.517 | 64.2 | — |
| 13 | | Plano | | 0.263 | | | | |
| 14 | Image | Plano | | — | | | | |

Reference wavelength (d-line) is 587.6 nm.

TABLE 22

| Aspheric Coefficients | | | | | |
|---|---|---|---|---|---|
| | Surface # | | | | |
| | 2 | 3 | 4 | 5 | 6 |
| k = | −1.9327E+01 | −6.4004E+01 | −1.0000E+02 | −1.0000E+02 | −5.7421E+00 |
| A4 = | −3.6010E−01 | −2.1781E+00 | −1.6314E+00 | −1.8127E−01 | −3.7633E−01 |
| A6 = | −1.4276E+00 | 1.7028E+00 | −3.8897E+00 | −4.3548E+00 | 1.2827E−01 |

TABLE 22-continued

Aspheric Coefficients

| A8 = | −3.5293E+00 | −7.4043E+00 | −5.7132E+00 | 7.5315E+00 | 5.3707E+00 |
|---|---|---|---|---|---|
| A10 = | −1.9519E+01 | 1.0590E+01 | 7.8698E+01 | 1.1192E+01 | −8.9582E+00 |
| A12 = | −3.1962E+01 | 3.5353E+01 | −1.8632E+02 | −6.1460E+01 | −5.9764E+00 |
| A14 = | −1.4226E+00 | −2.1633E+02 | 2.8253E+02 | 7.7158E+01 | 3.4180E+01 |
| A16 = | | | | | −2.9764E+01 |

Surface #

| | 7 | 8 | 9 | 10 | 11 |
|---|---|---|---|---|---|
| k = | −6.9933E−01 | −4.1026E+00 | −7.9133E+00 | −8.74165E−01 | −4.2133E+00 |
| A4 = | 6.2986E−01 | 5.7456E−01 | 6.7856E−01 | −1.47633E+00 | −4.4994E−01 |
| A6 = | −7.8130E−01 | −7.6347E−01 | 9.0440E−01 | 3.93063E+00 | 1.1148E+00 |
| A8 = | 3.6553E+00 | 4.4290E+00 | −5.3670E+00 | −8.11682E+00 | −1.9547E+00 |
| A10 = | −3.6905E+00 | −2.0104E+01 | 9.1903E+00 | 1.08178E+01 | 2.0786E+00 |
| A12 = | 4.5351E+00 | 3.6864E+01 | −8.1415E+00 | −8.78014E+00 | −1.3083E+00 |
| A14 = | −4.8811E+00 | −3.0724E+01 | 3.6159E+00 | 3.94115E+00 | 4.4608E−01 |
| A16 = | | 7.7830E+00 | −5.6624E−01 | −7.50631E−01 | −6.3660E−02 |

In the imaging lens system according to the 11th embodiment, the definitions of these parameters shown in the following table are the same as those stated in the 1st embodiment with corresponding values for the 11th embodiment. Moreover, these parameters can be calculated from Table 21 and Table 22 as the following values and satisfy the following relationships:

| f [mm] | 1.90 | f3/f2 | 0.224 |
|---|---|---|---|
| Fno | 2.87 | Dr6r9/CT3 | 0.595 |
| HFOV [deg.] | 38.7 | (V2 + V4)/V1 | 0.831 |
| f/f4 | −0.572 | f/f3 | 1.232 |
| f/R3 | 0.415 | |f/f1| + |f/f2| | 1.023 |
| |f5/f4| | 1.212 | | |

It is to be noted that TABLES 1-22 show different data of the different embodiments; however, the data of the different embodiments are obtained from experiments. Therefore, any imaging lens system of the same structure is considered to be within the scope of the present disclosure even if it uses different data. The embodiments depicted above and the appended drawings are exemplary and are not intended to limit the scope of the present disclosure.

What is claimed is:

1. An imaging lens system comprising, in order from an object side to an image side:
 a first lens element with positive refractive power having a convex object-side surface at a paraxial region;
 a second lens element having positive refractive power;
 a third lens element having positive refractive power;
 a fourth lens element having refractive power; and
 a fifth lens element with refractive power having a concave image-side surface at a paraxial region, wherein the image-side surface of the fifth lens element changes from concave at the paraxial region to convex at a peripheral region, and both of an object-side surface and the image-side surface of the fifth lens element are aspheric;
 wherein a focal length of the imaging lens system is f, a curvature radius of an object-side surface of the second lens element is R3, a focal length of the fourth lens element is f4, a focal length of the fifth lens element is f5, and the following relationships are satisfied:

$-0.80 < f/R3 < 4.0;$ $-1.5 < f/f4 < 0.45;$ and $0 < |f5/f4| < 1.50.$

2. The imaging lens system of claim 1, wherein the focal length of the imaging lens system is f, a focal length of the first lens element is f1, a focal length of the second lens element is f2, and the following relationship is satisfied:

$0.3 < |f/f1| + |f/f2| < 0.8.$

3. The imaging lens system of claim 1, wherein the object-side surface of the fifth lens element has at least two critical points.

4. The imaging lens system of claim 1, wherein the fifth lens element with negative refractive power has a convex object-side surface at a paraxial region.

5. The imaging lens system of claim 4, wherein a focal length of the third lens element is f3, a focal length of the second lens element is f2, and the following relationship is satisfied:

$0 < f3/f2 < 0.80.$

6. The imaging lens system of claim 4, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and T23 is the largest axial distance among T12, T23, T34, and T45.

7. The imaging lens system of claim 1, wherein the third lens element has a convex image-side surface.

8. The imaging lens system of claim 7, wherein the focal length of the imaging lens system is f, a focal length of the third lens element is f3, and the following relationship is satisfied:

$1.20 < f/f3 < 2.50.$

9. The imaging lens system of claim 8, wherein the image-side surface of the fourth lens element is inclined toward the image side of the imaging lens system at an end of a peripheral region of the image-side surface of the fourth lens element which within a location of a maximum effective radius thereof.

10. The imaging lens system of claim 7, wherein the fourth lens element has a concave object-side surface and a convex image-side surface.

11. The imaging lens system of claim 10, wherein an axial distance between the image-side surface of the third lens element and the object-side surface of the fifth lens element is Dr6r9, a central thickness of the third lens element is CT3, and the following relationship is satisfied:

$0.5 < Dr6r9/CT3 < 1.0$.

12. The imaging lens system of claim 10, wherein the focal length of the imaging lens system is f, the focal length of the fourth lens element is f4, and the following relationship is satisfied:

$-1.0 < f/f4 < 0$.

13. The imaging lens system of claim 12, wherein an Abbe number of the second lens element is V2, an Abbe number of the fourth lens element is V4, an Abbe number of the first lens element is V1, and the following relationship is satisfied:

$0.6 < (V2+V4)/V1 < 1.0$.

14. The imaging lens system of claim 12, wherein the focal length of the fifth lens element is f5, the focal length of the fourth lens element is f4, and the following relationship is satisfied:

$0.30 < |f5/f4| < 1.0$.

15. The imaging lens system of claim 12, wherein the object-side surface of the second lens element changes from convex at the paraxial region to concave at a peripheral region and an image-side surface of the second lens element changes from concave at a paraxial region to convex at a peripheral region.

16. An imaging lens system comprising, in order from an object side to an image side:
   a first lens element with positive refractive power having a convex object-side surface at a paraxial region;
   a second lens element having positive refractive power;
   a third lens element having positive refractive power;
   a fourth lens element having refractive power; and
   a fifth lens element with negative refractive power having a concave image-side surface at a paraxial region, wherein the image-side surface of the fifth lens element changes from concave at the paraxial region to convex at a peripheral region, and both of an object-side surface and the image-side surface of the fifth lens element are aspheric;
   wherein a focal length of the imaging lens system is f, a curvature radius of an object-side surface of the second lens element is R3, a focal length of the fourth lens element is f4, a focal length of the fifth lens element is f5, a focal length of the third lens element is f3, a focal length of the second lens element is f2, and the following relationships are satisfied:

$-0.80 < f/R3 < 4.0$;

$-2.0 < f/f4 < 1.0$;

$0 < |f5/f4| < 1.50$; and $0 < f3/f2 < 0.60$.

17. The imaging lens system of claim 16, wherein the focal length of the fifth lens element is f5, the focal length of the fourth lens element is f4, and the following relationship is satisfied:

$0.30 < |f5/f4| < 1.0$.

18. The imaging lens system of claim 16, wherein the object-side surface of the fifth lens element has at least two critical points.

19. The imaging lens system of claim 16, wherein the image-side surface of the second lens element changes from concave at a paraxial region to convex at a peripheral region.

20. The imaging lens system of claim 16, wherein an Abbe number of the second lens element is V2, an Abbe number of the fourth lens element is V4, an Abbe number of the first lens element is V1, and the following relationship is satisfied:

$0.6 < (V2+V4)/V1 < 1.0$.

21. The imaging lens system of claim 16, wherein an axial distance between the image-side surface of the third lens element and the object-side surface of the fifth lens element is Dr6r9, a central thickness of the third lens element is CT3, and the following relationship is satisfied:

$0.5 < Dr6r9/CT3 < 1.2$.

22. The imaging lens system of claim 21, wherein the fourth lens element has a concave object-side surface and a convex image-side surface.

23. The imaging lens system of claim 21, wherein the focal length of the imaging lens system is f, the focal length of the fourth lens element is f4, and the following relationship is satisfied:

$-1.0 < f/f4 < 0$.

* * * * *